(12) United States Patent
Fujimoto et al.

(10) Patent No.: US 11,303,525 B2
(45) Date of Patent: Apr. 12, 2022

(54) COMMUNICATION SYSTEM, COMMUNICATION CONTROL METHOD, AND COMMUNICATION PROGRAM

(71) Applicant: NEC Corporation, Tokyo (JP)

(72) Inventors: Go Fujimoto, Tokyo (JP); Tsukasa Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 16/478,242

(22) PCT Filed: Jan. 17, 2018

(86) PCT No.: PCT/JP2018/001188
§ 371 (c)(1),
(2) Date: Jul. 16, 2019

(87) PCT Pub. No.: WO2018/142935
PCT Pub. Date: Aug. 9, 2018

(65) Prior Publication Data
US 2019/0363941 A1    Nov. 28, 2019

(30) Foreign Application Priority Data

Feb. 2, 2017 (JP) .............................. JP2017-017743

(51) Int. Cl.
| | | |
|---|---|---|
| H04L 12/28 | (2006.01) | |
| H04L 41/0893 | (2022.01) | |
| H04L 45/00 | (2022.01) | |

(52) U.S. Cl.
CPC .......... *H04L 41/0893* (2013.01); *H04L 45/38* (2013.01); *H04L 45/72* (2013.01)

(58) Field of Classification Search
None
See application file for complete search history.

(56) References Cited

U.S. PATENT DOCUMENTS

| | | | |
|---|---|---|---|
| 8,635,272 B2* | 1/2014 | Reisman | G06Q 30/0601 709/203 |
| 9,825,911 B1* | 11/2017 | Brandwine | H04L 65/1069 |

(Continued)

FOREIGN PATENT DOCUMENTS

| | | | |
|---|---|---|---|
| JP | 2006-067314 A | 3/2006 | |
| JP | 2009-135697 A | 6/2009 | |

(Continued)

OTHER PUBLICATIONS

Japanese Notification of Reasons for Refusal issued in JP 2017-017743 dated Aug. 7, 2018.

(Continued)

*Primary Examiner* — Gerald A Smarth
(74) *Attorney, Agent, or Firm* — Sughrue Mion, PLLC

(57) ABSTRACT

Provided is a communication system in which an administrator can easily perform setting for communication. When having received a new packet, which is a packet for which control information conforming to header information has not been set yet, a packet transfer means 72 notifies a control means 71 of header information of the new packet. The control means 71 holds a list of items that can be specified from an IP address, and sets control information in the packet transfer means 72 on the basis of an item specified from an IP address included in the header information and on the basis of the list, when the header information is notified from the packet transfer means 72.

12 Claims, 12 Drawing Sheets

(56) References Cited

U.S. PATENT DOCUMENTS

| | | | | |
|---|---|---|---|---|
| 2006/0262583 | A1* | 11/2006 | Venkatachary | H03M 7/30 365/49.17 |
| 2012/0084460 | A1* | 4/2012 | McGinnity | H04L 67/327 709/242 |
| 2013/0263214 | A1* | 10/2013 | Yamagata | H04W 12/08 726/1 |
| 2013/0275620 | A1* | 10/2013 | Morita | H04L 45/42 709/244 |
| 2013/0305345 | A1* | 11/2013 | Bugenhagen | H04L 61/1552 726/12 |
| 2014/0222960 | A1* | 8/2014 | Fang | H04L 65/80 709/217 |
| 2014/0280838 | A1* | 9/2014 | Finn | H04L 49/00 709/223 |
| 2016/0036838 | A1* | 2/2016 | Jain | H04L 63/1416 726/23 |
| 2016/0080395 | A1* | 3/2016 | Reddy | H04L 63/0236 726/23 |
| 2018/0063072 | A1* | 3/2018 | Wackerly | H04L 29/06102 |

FOREIGN PATENT DOCUMENTS

| | | |
|---|---|---|
| JP | 2009-272659 A | 11/2009 |
| JP | 2014-045245 A | 3/2014 |
| JP | 2015-095789 A | 5/2015 |
| JP | 2015-186001 A | 10/2015 |
| JP | 2016-092673 A | 5/2016 |
| JP | 2016-178530 A | 10/2016 |
| WO | 2012/144583 A1 | 10/2012 |

OTHER PUBLICATIONS

International Search Report of PCT/JP2018/001188 dated Mar. 4, 2018.

* cited by examiner

| DOMAIN NAME | COMMUNICATION INTERFACE | SUPPLEMENTARY INFORMATION |
|---|---|---|
| xxxxx.co.jp | Ethernet | "www2.xxxxx.co.jp" IS EXCEPTION |
| www.yyyyy.co.jp | WIRELESS LAN (5 GHz) | TRANSMISSION SOURCE PROCESS IS "/user/bin/ processA" |
| www.yyyyy.co.jp | WIRELESS LAN (2.4 GHz) | TRANSMISSION SOURCE MAC ADDRESS IS "01:02:03:04:05:06" |
| www.zzzzz.co.jp | Ethernet | |

FIG. 5

| DOMAIN NAME | IP ADDRESS | VALID PERIOD (sec) |
|---|---|---|
| www.xxxxx.co.jp | 1.1.1.1 | 172,800 |
| www.xxxxx.co.jp | 2.2.2.2 | 172,800 |
| www.yyyyy.co.jp | 3.3.3.3 | 86,400 |
| www.yyyyy.co.jp | 4.4.4.4 | 86,400 |
| www.yyyyy.co.jp | 5.5.5.5 | 86,400 |
| www.zzzzz.co.jp | 6.6.6.6 | 172,800 |

FIG. 11

| PROCESS NAME | COMMUNICATION INTERFACE TO DESTINATION SIDE | SUPPLEMENTARY INFORMATION |
|---|---|---|
| /usr/bin/abc | WirelessLAN | |
| /sbin/xyz | Cellular | "DESTINATION IP ADDRESS IS 192.168.10.0/24, DESTINATION PORT NUMBER IS 443 OR 80" |
| /bin/abc | Ethernet | "PORT NUMBERS 20 AND 21" ARE EXCEPTION |

| USER NAME | COMMUNICATION INTERFACE TO DESTINATION SIDE | SUPPLEMENTARY INFORMATION |
|---|---|---|
| root | Cellular | |
| userA | Ethernet | "DESTINATION IP ADDRESS IS 192.168.10.0/24, DESTINATION PORT NUMBER IS 443 OR 80" |

COMMUNICATION SYSTEM, COMMUNICATION CONTROL METHOD, AND COMMUNICATION PROGRAM

CROSS REFERENCE TO RELATED APPLICATIONS

This application is a National Stage of International Application No. PCT/JP2018/001188 filed Jan. 17, 2018, claiming priority based on Japanese Patent Application No. 2017-017743 filed Feb. 2, 2017, the entire disclosures of which are incorporated herein.

TECHNICAL FIELD

The present invention relates to a communication system for transferring a packet, and a communication control method and a communication program applied to the communication system.

BACKGROUND ART

OpenFlow is known as a protocol for a control device to control a switch that transfers a packet.

In the OpenFlow, the control device sets a flow entry in the switch. Then, the switch processes the received packet in accordance with the flow entry. The flow entry is information defining an operation (for example, forwarding, discarding, and the like) on the packet. The flow entry is set for each flow of the packet. When the switch receives a packet, if there is a flow entry corresponding to the flow of the packet, the switch processes the packet in accordance with the flow entry. Whereas, when there is no flow entry corresponding to the flow of the received packet, the switch notifies the control device to that effect. Then, the control device determines a flow entry corresponding to the flow of the packet and sets the flow entry in the switch.

Further, PTL 1 describes a gateway device that extracts a full qualified domain name (FQDN) from a received domain name system (DNS) query packet, and associates destination information extracted from the FQDN and a virtual Internet protocol (IP) address. Furthermore, PTL 1 states that when the gateway device recognizes that a destination IP address of a SYN packet is the above virtual IP address, the destination information is searched.

Further, PTL 2 describes a relay device that has a DNS cache recording a domain name and an IP address, searches the DNS cache with the IP address, and checks whether or not there is a different IP address with a same domain name.

Further, PTL 3 describes a communication service classification device that extracts a domain name and an IP address on the basis of a response from a DNS server. Furthermore, PTL 3 states that the communication service classification device extracts a transmission IP address from a user terminal to a server, and extracts a domain name associated with the transmission IP address.

Further, PTL 4 describes a communication device that stores an IP address corresponding to a domain name of a bundle distribution server, and discards a packet addressed to the IP address corresponding to the domain name when a predetermined condition is satisfied.

CITATION LIST

Patent Literature

PTL 1: Japanese Patent Application Laid-Open No. 2009-135697
PTL 2: Japanese Patent Application Laid-Open No. 2014-45245
PTL 3: Japanese Patent Application Laid-Open No. 2015-186001
PTL 4: Japanese Patent Application Laid-Open No. 2016-92673

SUMMARY OF INVENTION

Technical Problem

Examples of a communication system for transferring a packet include a communication device such as a gateway, for example. When an administrator of such a communication device sets communication that can be permitted or communication that cannot be permitted for the communication device, an IP address or a port number has been used.

However, IP addresses are often automatically assigned by a dynamic host configuration protocol (DHCP). Therefore, in many cases, the administrator cannot easily grasp the IP address corresponding to a transmission source or a destination in communication that can be permitted or communication that cannot be permitted. As a result, it has not been easy for the administrator to set communication that can be permitted or communication that cannot be permitted, for the communication device.

Then, an object of the present invention is to provide a communication system, a communication control method, and a communication program for enabling an administrator to easily perform setting for communication.

Solution to Problem

A communication system according to the present invention includes: a packet transfer means to transfer a packet; and a control means to set, in the packet transfer means, control information defining an operation of the packet transfer means according to header information of a packet. In the communication system, when having received a new packet, which is a packet for which control information conforming to header information has not been set yet, the packet transfer means notifies the control means of header information of the new packet, and the control means holds a list of items that can be specified from an IP address, and sets control information in the packet transfer means on the basis of an item specified from an IP address included in the header information and on the basis of the list, when the header information is notified from the packet transfer means.

Further, a communication control method according to the present invention is a communication control method applied to a communication system including a packet transfer means to transfer a packet; and a control means to hold a list of items that can be specified from an IP address, and set, in the packet transfer means, control information defining an operation of the packet transfer means according to header information of a packet. In the communication control method, when having received a new packet, which is a packet for which control information conforming to header information has not been set yet, the packet transfer means notifies the control means of header information of the new packet, and the control means sets control information in the packet transfer means on the basis of an item specified from an IP address included in the header information and on the basis of the list, when the header information is notified from the packet transfer means.

Further, a communication program according to the present invention is a communication program installed in a computer including: a packet transfer means to transfer a packet; and a control means to hold a list of items that can be specified from an IP address, and set, in the packet transfer means, control information defining an operation of the packet transfer means according to header information of a packet. The communication program causes the computer to execute: a notification process in which, when having received a new packet, which is a packet for which control information conforming to header information has not been set yet, the packet transfer means notifies the control means of header information of the new packet; and a control information setting process in which the control means sets control information in the packet transfer means on the basis of an item specified from an IP address included in the header information and on the basis of the list, when the header information is notified from the packet transfer means.

Advantageous Effects of Invention

According to the present invention, an administrator can easily perform setting for communication.

BRIEF DESCRIPTION OF DRAWINGS

FIG. 5 It depicts an explanatory view showing an example of a correspondence between a domain name and an IP address stored in a control unit.

FIG. 11 It depicts an explanatory view showing an example of a list in the second exemplary embodiment.

DESCRIPTION OF EMBODIMENTS

Hereinafter, exemplary embodiments of the present invention will be described with reference to the drawings.

Figure 1:
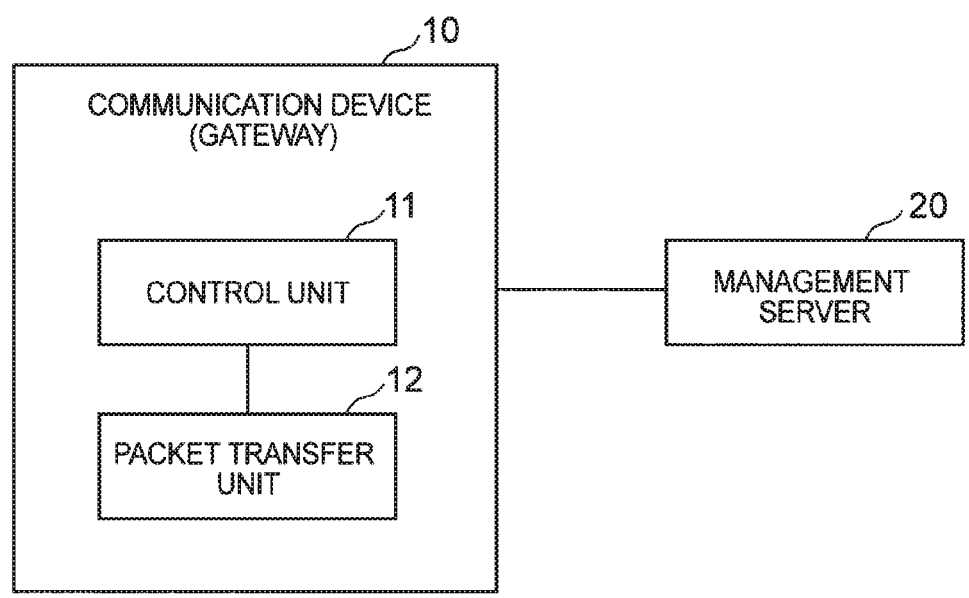
FIG. 1 It depicts an explanatory diagram showing an example of a communication system of the present invention.

FIG. 1 is an explanatory diagram showing an example of a communication system of the present invention. In each exemplary embodiment shown below, as shown in FIG. 1, a description is given to a case, as an example, where the communication system of the present invention includes a communication device 10 to transfer a packet and a management server 20 for an administrator perform setting on the communication device 10. However, the communication device 10 to transfer a packet may be regarded as the communication system of the present invention.

Further, in each exemplary embodiment, a case where the communication device 10 is a gateway will be described as an example. Furthermore, in each exemplary embodiment, as an example, a description is given to a case where the communication device 10 includes a packet transfer unit 12 to transfer a packet and a control unit 11 to control the packet transfer unit 12. The control unit 11 controls the packet transfer unit 12 by setting, in the packet transfer unit 12, control information (corresponding to a flow entry in OpenFlow) defining an operation of the packet transfer unit 12 according to header information of a packet. The control unit 11 may control the packet transfer unit 12 in accordance with, for example, the OpenFlow, but a protocol for the control unit 11 to control the packet transfer unit 12 may not be the OpenFlow.

A packet for which control information conforming to header information has not been set yet in the packet transfer unit 12 is described as a new packet. When having received a new packet, the packet transfer unit 12 notifies the control unit 11 of header information of the new packet. When notified of the header information, the control unit 11 sets control information conforming to the header information in the packet transfer unit 12.

Further, the control unit 11 holds a list in which items that can be specified from an Internet protocol (IP) address are listed. This list is a list created by the administrator. Examples of an item that can be specified from an IP address include a domain name, but the item listed in a list is not limited to the domain name.

When the list includes an item specified from an IP address included in the header information (header information of the new packet) notified from the packet transfer unit 12, the control unit 11 sets control information indicating permission of communication by the packet, as control information according to the header information. However, as described later, even if the item specified from an IP address is included in the list, the control unit 11 may set control information indicating inhibition of communication by the packet.

Further, when the list does not include an item specified from an IP address included in the header information (header information of the new packet) notified from the packet transfer unit 12, the control unit 11 sets control information indicating inhibition of communication by the packet, as control information according to the header information.

The packet transfer unit 12 may be referred to as a switch unit 12. In each exemplary embodiment described below, the packet transfer unit 12 is described as the switch unit 12.

First Exemplary Embodiment

Figure 2:
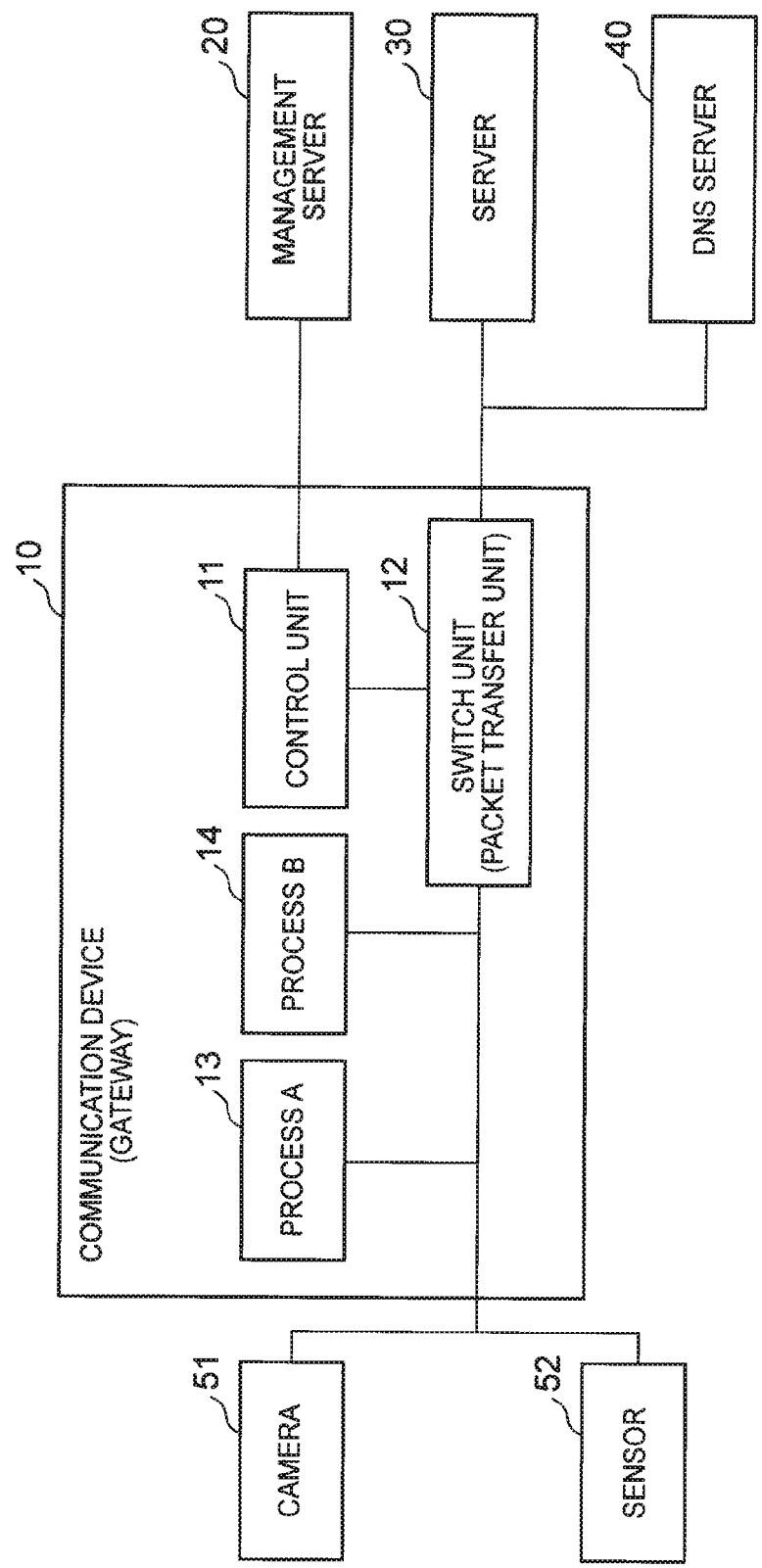
FIG. 2 It depicts a block diagram showing an example of a first exemplary embodiment of the communication system of the present invention.

FIG. 2 is a block diagram showing an example of a first exemplary embodiment of the communication system of the present invention. A communication system of the first exemplary embodiment includes a communication device 10 and a management server 20. As described above, a case where the communication device 10 is a gateway will be described as an example. The gateway 10 includes a packet transfer unit 12 (hereinafter, referred to as a switch unit 12) to transfer a packet, and a control unit 11 to control the switch unit 12.

The gateway 10 is connected to the management server 20 that manages the control unit 11, a general server 30 that processes data of a camera 51 and a sensor 52, and a domain name system (DNS) server 40, via a communication network. Further, for example, the gateway 10 is connected with the camera 51 and the sensor 52. The camera 51 and the sensor 52 are examples of devices connected under the gateway 10, and the devices connected under the gateway 10 are not limited to the camera 51 and the sensor 52.

The management server 20 is, for example, a cloud server, but may be a server other than the cloud server. The same applies to the server 30 and the DNS server 40.

In an example shown below, a description is given to a case, as an example, where the camera 51 communicates with the server 30 by designating a domain name of the server 30 by the camera 51. Note that, even when the sensor 52 or a process A 13 or a process B 14 internal of the gateway 10 communicates with the server 30, operations of the control unit 11, the switch unit 12, and each of the servers 20, 30, and 40 in the present exemplary embodiment are similar. Further, for example, the server 30 may access the camera 51 connected under the gateway 10. The operation in this case is also similar. Meanwhile, the number of internal processes of the gateway 10 is not particularly limited.

Figures 3, 4:
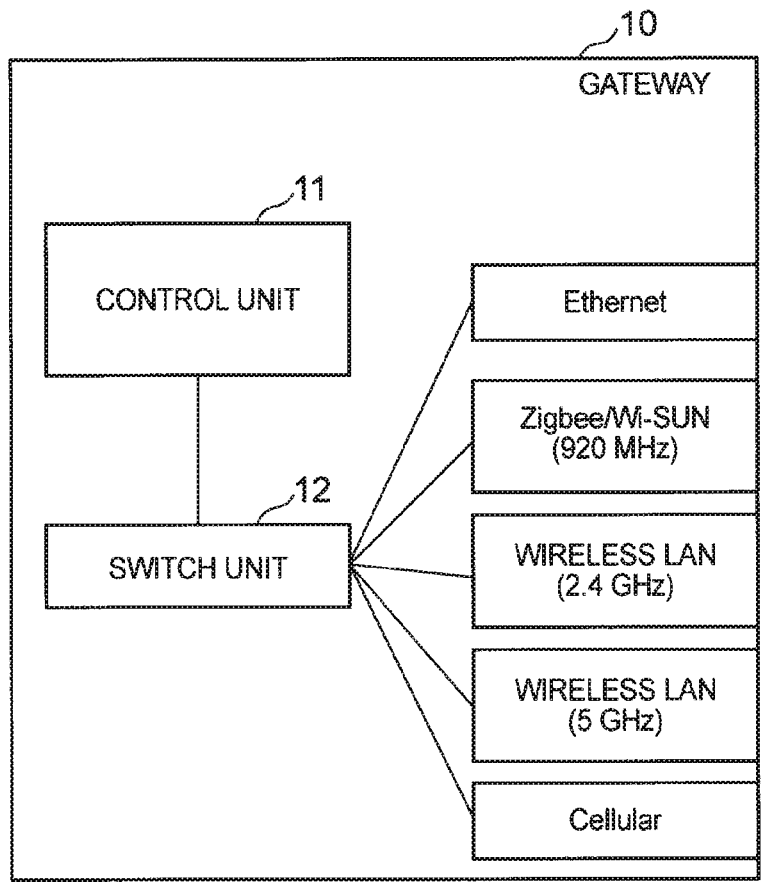
FIG. 3 It depicts an explanatory view showing an example of a communication interface included in a gateway.
FIG. 4 It depicts an explanatory diagram showing an example of a list in the first exemplary embodiment.

FIG. 3 is an explanatory diagram showing an example of a communication interface included in the gateway 10. The gateway 10 has a communication interface such as Ethernet (registered trademark), Zigbee/Wi-SUN (920 MHz), a wireless local area network (LAN) (2.4 GHz), a wireless LAN (5 GHz), Cellular, and the like as a communication interface, for example. These communication interfaces are physical communication interfaces.

Next, a function of the switch unit 12 (packet transfer unit 12) will be described. The function of the switch unit 12 described below is similar in each exemplary embodiment described later.

The switch unit 12 is logically connected to various physical communication interfaces illustrated in FIG. 3. When the switch unit 12 receives a packet from the outside of the gateway 10 or outputs a packet to the outside of the gateway 10, the switch unit 12 performs packet reception and packet output via any of the communication interfaces.

The switch unit 12 has a function of recognizing header information of a packet. Then, when a new packet (that is, a packet for which control information conforming to header information has not been set yet) is received, the control unit 11 is notified of header information of the packet. In addition, notifying the control unit 11 of header information of a packet means inquiring of the control unit 11 about control information according to the header information. The switch unit 12 holds the received new packet even after notifying the control unit 11 of the header information.

When the control unit 11 sets control information according to the header information as a result of the notification of the header information (an inquiry of the control information), the switch unit 12 processes the held new packet in accordance with the control information.

In control information indicating permission of communication by the new packet, outputting of a packet conforming to the header information and a communication interface to be used for outputting are designated. Therefore, when the control information indicating permission of communication by the new packet is set, the switch unit 12 outputs the held new packet from the communication interface designated by the control information. Further, the control information conforms to header information of a packet of the same flow as the new packet. Therefore, when receiving a packet of the same flow as the new packet after that, the switch unit 12 outputs the packet from the communication interface designated by the control information, without notifying the control unit 11 of header information.

Further, in control information indicating inhibition of communication by the new packet, it is designated that the packet conforming to the header information is discarded. Therefore, when the control information indicating inhibition of communication of the new packet is set, the switch unit 12 discards the held new packet in accordance with the control information. Further, the control information conforms to header information of a packet of the same flow as the new packet. Therefore, when receiving a packet of the same flow as the new packet after that, the switch unit 12 discards the packet in accordance with the control information without notifying the control unit 11 of header information.

Next, the control unit 11 will be described.

When receiving notification of header information of a packet from the switch unit 12, the control unit 11 sets, in the switch unit 12, control information defining an operation of the switch unit 12 according to the header information. The control unit 11 determines whether to set control information indicating permission of communication by the packet, or to set control information indicating inhibition of communication by the packet, on the basis of a list held in advance. This list is a list of items that can be specified from an IP address. In the first exemplary embodiment, the control unit 11 holds a list of domain names as the list of items that can be specified from an IP address.

This list is in principle a white list. Therefore, when the list includes a domain name specified from an IP address (in the present exemplary embodiment, a destination IP address) included in header information notified from the switch unit 12, the control unit 11 sets, in the switch unit 12, control information indicating permission of communication. Further, when the list does not include the domain name specified from the destination IP address included in the header information notified from the switch unit 12, the control unit 11 sets, in the switch unit 12, control information indicating inhibition of communication.

Further, when notified of header information in which a destination IP address and a transmission source IP address are reversed with respect to the header information corresponding to the control information indicating permission of communication, which is control information that has already been set, the control unit 11 sets, in the switch unit 12, control information for transmitting a packet to the destination IP address included in the header information.

Further, even if the list includes an item (a domain name in this exemplary embodiment) specified by the control unit 11 from the destination IP address, when supplementary information is described for the item in the list, the control unit 11 determines whether to set control information indicating permission of communication or to set control information indicating inhibition of communication, on the basis of the supplementary information.

FIG. 4 is an explanatory view showing an example of a list in the first exemplary embodiment. In the list illustrated in FIG. 4, combinations of a domain name, a communication interface, and supplementary information are listed. In the present exemplary embodiment, one combination of a domain name, a communication interface, and supplementary information corresponds to one record.

The communication interface in the record represents a communication interface to be used for packet output when communication is permitted since a domain name in the list is specified from a destination IP address. For example, in the example shown in FIG. 4, when a domain name "www.zzzzz.co.jp" is specified from a destination IP address included in header information of a certain packet, the control unit 11 sets, in the switch unit 12, control information defining that the packet is to be outputted via "Ethernet", as control information conforming to the header information.

The supplementary information in the record is information indicating an exception (that is, when the communication is inhibited) in a case where a domain name in the list is specified from a destination IP address or a condition for permitting communication. In the supplementary information illustrated in FIG. 4, the supplementary information of "'www2.xxxxx.co.jp' is exception" indicates that communication is permitted in principle when a domain name corresponding to xxxxx.co.jp is specified from a destination IP address included in header information of a certain packet, but communication is not permitted when the specified domain name is "www2.xxxxx.co.jp". Therefore, when "www3.xxxxx.co.jp" or the like is specified from a destination IP address, the control unit 11 sets, in the switch unit 12, control information indicating permission of communication (control information defining outputting of a packet via "Ethernet"). Further, when "www2.xxxxx.co.jp" is specified from a destination IP address, the control unit 11 exceptionally sets, in the switch unit 12, control information indicating inhibition of communication (control information defining discarding of a packet).

Further, in the supplementary information illustrated in FIG. 4, supplementary information of "transmission source process is 'user/bin/processA'", and supplementary information of "transmission source media access control (MAC) address is '01:02:03:04:05:06'" indicate a condition for permitting communication. For example, when the control unit 11 specifies "www.yyyyy.co.jp" from a destination IP address, the domain name is included in the list name. Even in that case, for example, only when a condition of "transmission source process is '/user/bin/processA'", or a condition of "transmission source media access control (MAC) address is '01:02:03:04:05:06'" is satisfied, the control unit 11 sets, in the switch unit 12, control information indicating permission of communication.

Note that, in the last record illustrated in FIG. 4, supplementary information corresponding to "www.zzzzz.co.jp" is not described. Therefore, when "www.zzzzz.co.cp" is specified from a destination IP address, the control unit 11 may simply set control information indicating permission of communication without considering exceptions and conditions.

Further, each record in the list may include any comment described by the administrator.

The list is created in advance by the administrator of the communication system. The management server 20 transmits the list to the control unit 11 of the gateway 10 in accordance with an operation of the administrator, and the control unit 11 holds the received list.

Further, for a packet (DNS query) with an IP address of the DNS server 40 as the destination IP address, or a packet (DNS query response) with an IP address of the DNS server 40 as the transmission source IP address, the control unit 11 sets control information indicating permission of communication without specifying a domain name from the IP address or referring to the list.

Further, in the first exemplary embodiment, when the switch unit 12 receives a DNS query response from the DNS server 40, the control unit 11 extracts a correspondence between a domain name and an IP address from the DNS query response, and stores the correspondence. The DNS query response is a packet transmitted by the DNS server 40 as a response to the DNS query, and includes a domain name included in the DNS query and an IP address obtained by the DNS server 40 by name resolution. In this example, the camera 51 transmits a DNS query and receives a DNS query response. Thereafter, the camera 51 transmits a packet with an IP address included in the DNS query response as the destination IP address. At this time, since the control unit 11 stores a relationship between an IP address and a domain name, the control unit 11 can specify the domain name from the destination IP address.

The control unit 11 stores the correspondence between a domain name and an IP address, for example, in a form of a table. FIG. 5 is an explanatory view showing an example of a correspondence between a domain name and an IP address stored in the control unit 11. FIG. 5 shows a case where the control unit 11 stores a correspondence between a domain name and an IP address, and also stores a valid period of the correspondence. Information of the valid period is included in the DNS query response. Therefore, when the switch unit 12 receives the DNS query response, the control unit 11 may associate and store a domain name, an IP address, and a valid period included in the query response.

Further, in each record illustrated in FIG. 5, the control unit 11 may define a common valid period. That is, the control unit 11 may integrate the valid period of the correspondences between a domain name and an IP address into one value. In this case, the control unit 11 preferably uses 604,800 sec (7 days) or a value slightly larger than that value as the common valid period.

The control unit 11 deletes a record whose valid period has passed, from the individual records (see FIG. 5) indicating a correspondence between a domain name and an IP address. In the server 30, the correspondence between the domain name and the IP address may be changed. Therefore, the control unit 11 may delete old correspondence by storing a correspondence between a domain name and an IP address and also storing a time limit (valid period) for storing the correspondence. Meanwhile, the control unit 11 may simply delete a record whose valid period has passed, from the individual records indicating a correspondence between a domain name and an IP address. Even if a new record indicating a correspondence between a domain name and an IP address is added, the control unit 11 need not delete the old record indicating a correspondence between a domain name and an IP address if the valid period of the old record has not passed.

Further, when having set control information in the switch unit 12 since the list includes an item (domain name in this exemplary embodiment) specified from the destination IP address, the control unit 11 stores a correspondence between the item included in the list and the control information. For example, the control unit 11 associates and stores the control information and the record in the list that has been referred to in determining the control information. For example, when the control unit 11 specifies "www.zzzzz.co.jp" from the destination IP address and creates control information indicating permission of communication since the domain name is included in the list, the control unit 11 associates and stores the last record shown in FIG. 4 and the control information. The control information stored in association with the record of the list may be control information indicating inhibition of communication. For example, when the control unit 11 specifies "www2.xxxxx.co.jp" from the destination IP address and sets control information indicating inhibition of communication based on the first record shown in FIG. 4, the control unit 11 associates and stores the first record shown in FIG. 4 and the control information.

Whereas, when having set control information indicating inhibition of communication since the item specified from the destination IP address is not included in the list, the control unit 11 does not store the correspondence between the item and the control information. In other words, since the specified item is not included in the list, the control unit 11 cannot associate the item in the list (record corresponding to the specified item in the list) with the control information.

Further, when having set control information in the switch unit 12, the control unit 11 transmits, to the management server 20, an item specified from a destination IP address when setting the control information, and contents of the control information. The management server 20 holds these pieces of information received from the control unit 11 as log information. Meanwhile, the control unit 11 may transmit the control information itself to the management server 20 as contents of the control information. Alternatively, the control unit 11 may transmit, to the management server 20, information indicating whether communication is permitted or inhibited, as contents of the control information.

The management server 20 presents, to the administrator, an item specified from a destination IP address when control information indicating inhibition of communication is set. For example, the management server 20 may display the item on a display device (not shown). Alternatively, the management server 20 may present the item to the administrator by another method such as e-mail transmission. Hereinafter, a description is given to a case, as an example, where the management server 20 presents information to a user by displaying information on a display device.

Meanwhile, the management server 20 may present the entire log information to the administrator.

In a case where an instruction for adding, to the list, an item specified from a destination IP address is inputted from the administrator when control information indicating inhibition of communication is set, the management server 20 transmits the instruction to the control unit 11. Note that, in this case, the administrator also designates a communication interface (see FIG. 4) corresponding to the item. Further, in a case of defining supplementary information, the administrator also designates supplementary information corresponding to the item. When the control unit 11 receives the instruction, the control unit 11 adds, to the list, a record in which at least the item and the communication interface are associated with each other in accordance with the instruction. When the supplementary information is also designated in the instruction, the control unit 11 adds, to the list, a record in which the item, the communication interface, and the supplementary information are associated with each other. Further, at this time, the control unit 11 specifies all the control information being not associated with any item in the list (more specifically, any record in the list) and indicating inhibition of communication, designates all the specified control information, and commands the switch unit 12 to delete the control information. The switch unit 12 deletes the control information designated by the control unit 11 in accordance with the command.

Further, the management server 20 may be inputted with an instruction, from the administrator, to delete an item designated by the administrator (more specifically, a record designated by the administrator in the list) from the list. In this case, the management server 20 transmits the instruction to the control unit 11. When receiving the instruction, the control unit 11 deletes the item designated by the administrator (a record designated by the administrator in the list) from the list in accordance with the instruction. Further, the control unit 11 specifies all the control information associated with the record, designates all the specified control information, and commands the switch unit 12 to delete the control information. The switch unit 12 deletes the control information designated by the control unit 11 in accordance with the command.

The control unit 11 and the switch unit 12 are realized by, for example, a central processing unit (CPU) of a computer that operates in accordance with a communication program. In this case, the CPU may simply read a communication program from a program storage medium such as a program storage device (not shown) of the computer, and operate as the control unit 11 and the switch unit 12 in accordance with the program. This point is also similar in each exemplary embodiment described later.

Next, a processing progress of the first exemplary embodiment will be described.

Figure 6:
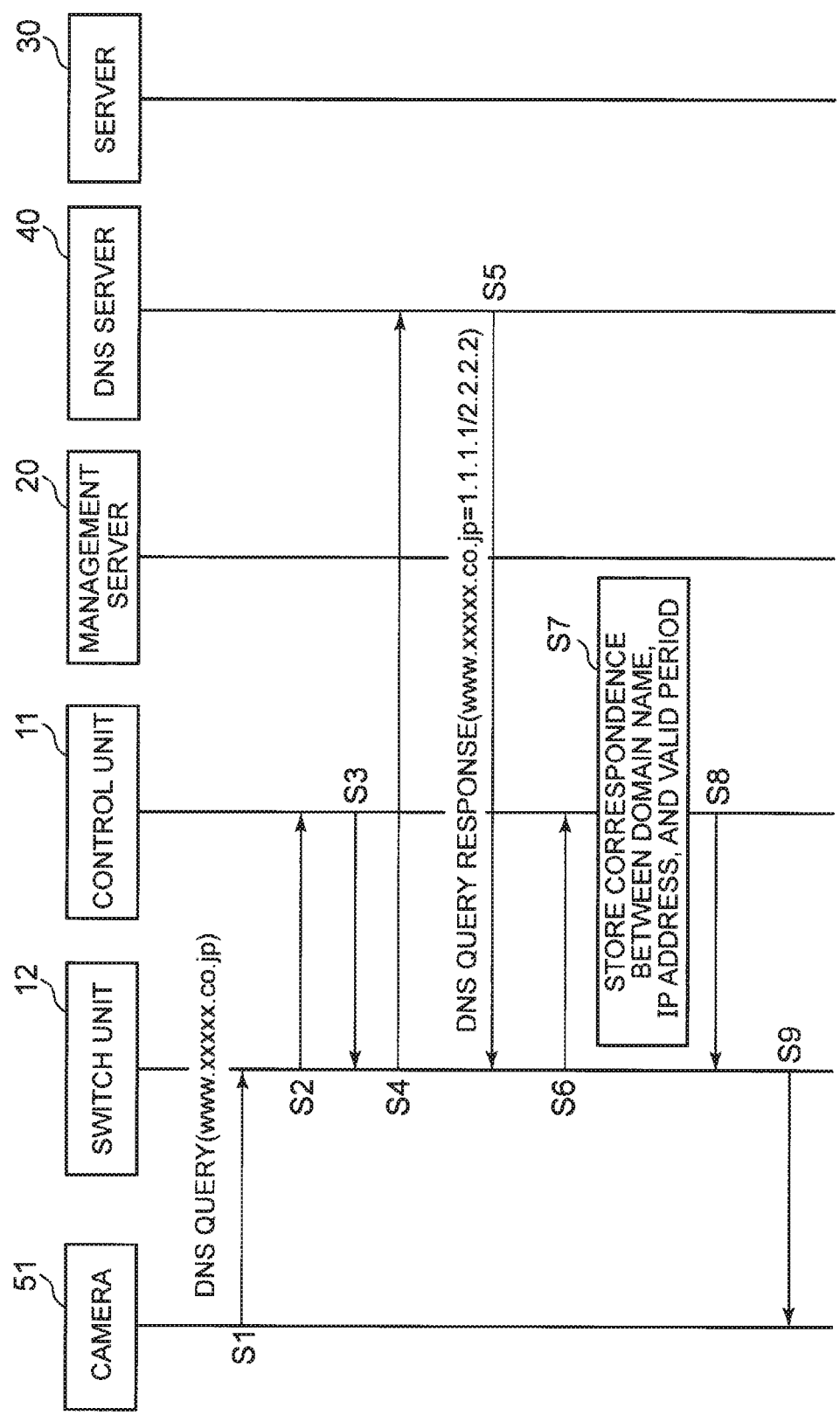
FIG. 6 It depicts a sequence diagram showing an example of a processing progress of processing for the control unit to store a correspondence between a domain name and an IP address.

FIG. 6 is a sequence diagram showing an example of a processing progress of processing for the control unit 11 to store a correspondence between a domain name and an IP address. In this example, a description is given while assuming that the domain name of the server 30 is "www.xxxxx.co.jp".

First, in communicating with the server 30 via the gateway 10, the camera 51 transmits a DNS query including the domain name "www.xxxxx.co.jp" (step S1).

The switch unit 12 receives the DNS query. Here, it is assumed that the DNS query is a new packet. In this case, the switch unit 12 notifies the control unit 11 of header information of the DNS query (step S2). Note that, in the present exemplary embodiment, a description is given with an example in which the switch unit 12 sends a copy of the received packet to the control unit 11 to notify the control unit 11 of the header information. Further, the switch unit 12 holds the DNS query received from the camera 51.

A destination IP address of the DNS query is an IP address of the DNS server 40. In this case, the control unit 11 sets control information indicating permission of communication in the switch unit 12 without specifying a domain name from the IP address or referring to the list (step S3). That is, the control unit 11 sets, in the switch unit 12, control information defining outputting of the packet from the communication interface that is used for communication with the DNS server 40. Note that, for example, the control unit 11 may hold a list of destination IP addresses (an IP address of a predetermined specific server) to be permitted for communication, separately from the list illustrated in FIG. 4. Then, since the IP address of the DNS server 40 is included in the list, the control unit 11 sets control information indicating permission of communication in the switch unit 12 as described above in step S3.

Next, the switch unit 12 outputs the held DNS query from the designated communication interface in accordance with the control information that has been set in step S3 (step S4). As a result, the DNS server 40 receives the DNS query.

Then, the DNS server 40 determines an IP address according to the domain name "www.xxxxx.co.jp" included in the DNS query. The DNS server 40 transmits a DNS query response including the domain name and the IP address, and information indicating a valid period of the correspondence between the both (step S5).

The switch unit 12 receives the DNS query response. This DNS query response is a new packet. In this case, the switch unit 12 notifies the control unit 11 of header information of the DNS query response by sending a copy of the DNS query response to the control unit 11 (step S6). Further, the switch unit 12 holds the received DNS query response.

The control unit 11 refers to the DNS query response and newly stores a record in which the domain name "www.xxxxx.co.jp", the IP address, and the valid period are associated with each other (step S7).

Further, a transmission source IP address of the DNS query response is the IP address of the DNS server 40. In this case, the control unit 11 sets control information indicating permission of communication in the switch unit 12 without specifying a domain name from the IP address or referring to the list (step S8). That is, the control unit 11 sets, in the switch unit 12, control information defining outputting of the packet from the communication interface that is used for communication with the camera 51.

Next, the switch unit 12 outputs the held DNS query response from the designated communication interface in accordance with the control information that has been set in step 8 (step S9). As a result, the camera 51 receives the DNS query response. As a result, the camera 51 recognizes the IP address corresponding to "www.xxxxx.co.jp" (that is, the IP address of the server 30).

Note that, although not described in FIG. 6, the control unit 11 notifies the management server 20 of contents of the control information after steps S3 and S8. For example, after steps S3 and S8, the control unit 11 transmits information indicating contents of "communication is permitted" to the management server 20.

Figure 7:
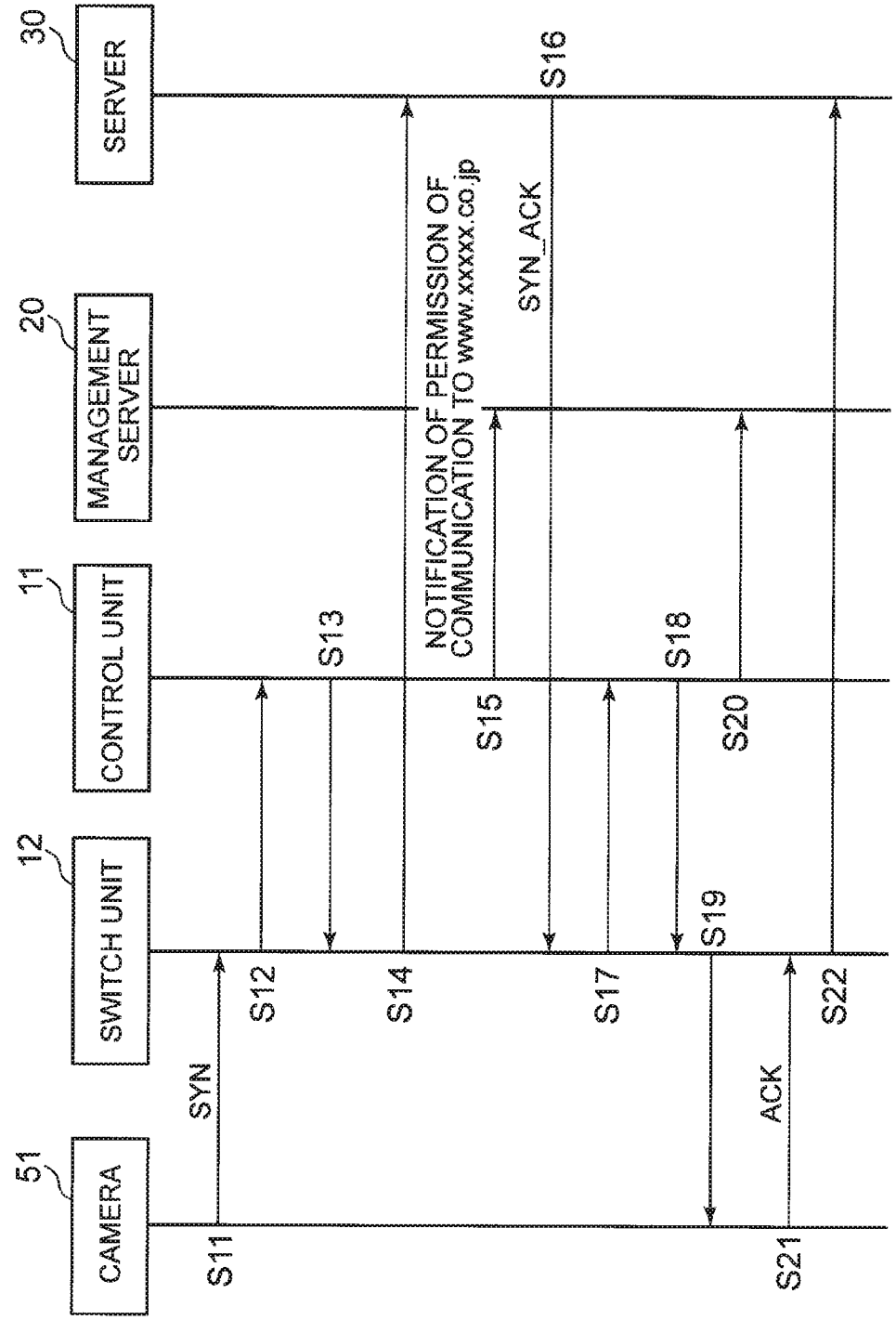
FIG. 7 It depicts a sequence diagram showing an example of a processing progress in a case of setting control information indicating permission of communication since a domain name specified from a destination IP address is included in a list.

FIG. 7 is a sequence diagram showing an example of a processing progress in a case of setting control information indicating permission of communication since a domain name specified from a destination IP address is included in the list. It is assumed that the process shown in FIG. 6 has been completed. Further, the control unit 11 is assumed to hold the list illustrated in FIG. 4.

The camera 51 transmits a SYN packet with the IP address of the server 30 as a destination (step S11).

The switch unit 12 receives the SYN packet. This SYN packet is a new packet. That is, control information conforming to header information of the SYN packet has not been set in the switch unit 12 yet. In this case, the switch unit 12 notifies the control unit 11 of header information of the SYN packet (step S12). Further, the switch unit 12 holds the SYN packet.

The control unit 11 specifies a domain name from a destination IP address included in the header information notified in step S12. In this example, the control unit 11 stores a correspondence between a domain name and an IP address of the server 30, in step S7 (see FIG. 6). The control unit 11 specifies the domain name "www.xxxxx.co.jp" from the destination IP address included in the header information by referring to the correspondence. Furthermore, the control unit 11 determines whether or not the domain name is included in the list. In this example, the domain name "www.xxxxx.co.jp" corresponds to the domain name of the first record shown in FIG. 4. Further, "www.xxxxx.co.jp" does not correspond to the exception (see FIG. 4) indicated by the supplementary information of the record. Therefore, on the basis of the first record shown in FIG. 4, the control unit 11 sets, in the switch unit 12, control information defining that the packet is to be outputted from the Ethernet as control information according to the header information of the SYN packet (step S13). Further, at this time, the control unit 11 stores a correspondence between the specified domain name (more specifically, a record corresponding to the domain name, in the list) and the control information.

The switch unit 12 outputs the held SYN packet from the Ethernet in accordance with the control information that has been set in step S13 (step S14). As a result, the server 30 receives the SYN packet.

Further, the control unit 11 notifies the management server 20 of the domain name specified from the destination IP address and contents of the set control information (step S15). For example, the control unit 11 transmits, to the management server 20, information of "communication to www.xxxxx.co.jp is permitted". When receiving the information of "communication is permitted", the management server 20 need not display the domain name specified from the destination IP address.

The server 30 transmits, as a response to the SYN packet, a SYN_ACK packet whose transmission source is the IP address of the server 30, with the IP address of the camera 51 as the destination (step S16). That is, in the SYN_ACK packet and the SYN packet, the destination IP address and the transmission source IP address are reversed.

The switch unit 12 receives the SYN_ACK packet. Control information conforming to header information of this SYN_ACK packet has not been set in the switch unit 12 yet. In this case, the switch unit 12 notifies the control unit 11 of header information of the SYN_ACK packet (step S17). Further, the switch unit 12 holds the SYN_ACK packet.

Here, the destination IP address and the transmission source IP address in the header information of the SYN_ACK packet are control information that has already been set, and are reversed with respect to the destination IP address and the transmission source IP address in the header information corresponding to the control information indicating permission of communication (that is, the control information that has been set in step S13). Therefore, the control unit 11 sets, in the switch unit 12, control information for transmitting the packet to the destination IP address included in the header information of the SYN_ACK packet. That is, the control unit 11 sets, in the switch unit 12, control information defining outputting of the packet from the communication interface that is used for communication with the camera 51 indicated by the destination IP address (step S18). At this time, the control unit 11 associates and stores a same record as the record associated with the control information having already been set and indicating permission of communication (the record that has been set in step S13), and the control information having been set in step S18.

The switch unit 12 outputs the held SYN_ACK packet in accordance with the control information that has been set in step S18 (step S19). As a result, the camera 51 receives the SYN_ACK packet.

Further, the control unit 11 transmits, for example, information indicating contents of "communication is permitted" to the management server 20 (step S20).

The camera 51 having received the SYN_ACK packet transmits an ACK packet (step S21). Header information of the ACK packet is similar to the header information of the SYN packet. Therefore, the control information that has been set in step S13 conforms to the header information of the ACK packet. Consequently, the switch unit 12 outputs the ACK packet in accordance with the control information (step S22). As a result, the server 30 receives the ACK packet.

Meanwhile, in step S13, the control unit 11 may set control information (control information specifying packet discarding) indicating inhibition of communication, on the basis of supplementary information corresponding to the domain name specified from the destination IP address. Also in this case, the control unit 11 associates and stores a record corresponding to the specified domain name in the list and the control information. In addition, the control unit 11 transmits, to the management server 20, the domain name specified from the destination IP address and contents of the set control information (for example, information of "communication is inhibited"). The management server 20 displays the domain name. As a result, the administrator can confirm the specified domain name in a case where communication has not been permitted. However, in the present example, communication has not been permitted as intended by the administrator since communication has not been permitted, on the basis of the supplementary information. Further, the switch unit 12 discards the held SYN packet in accordance with the control information.

Figure 8:
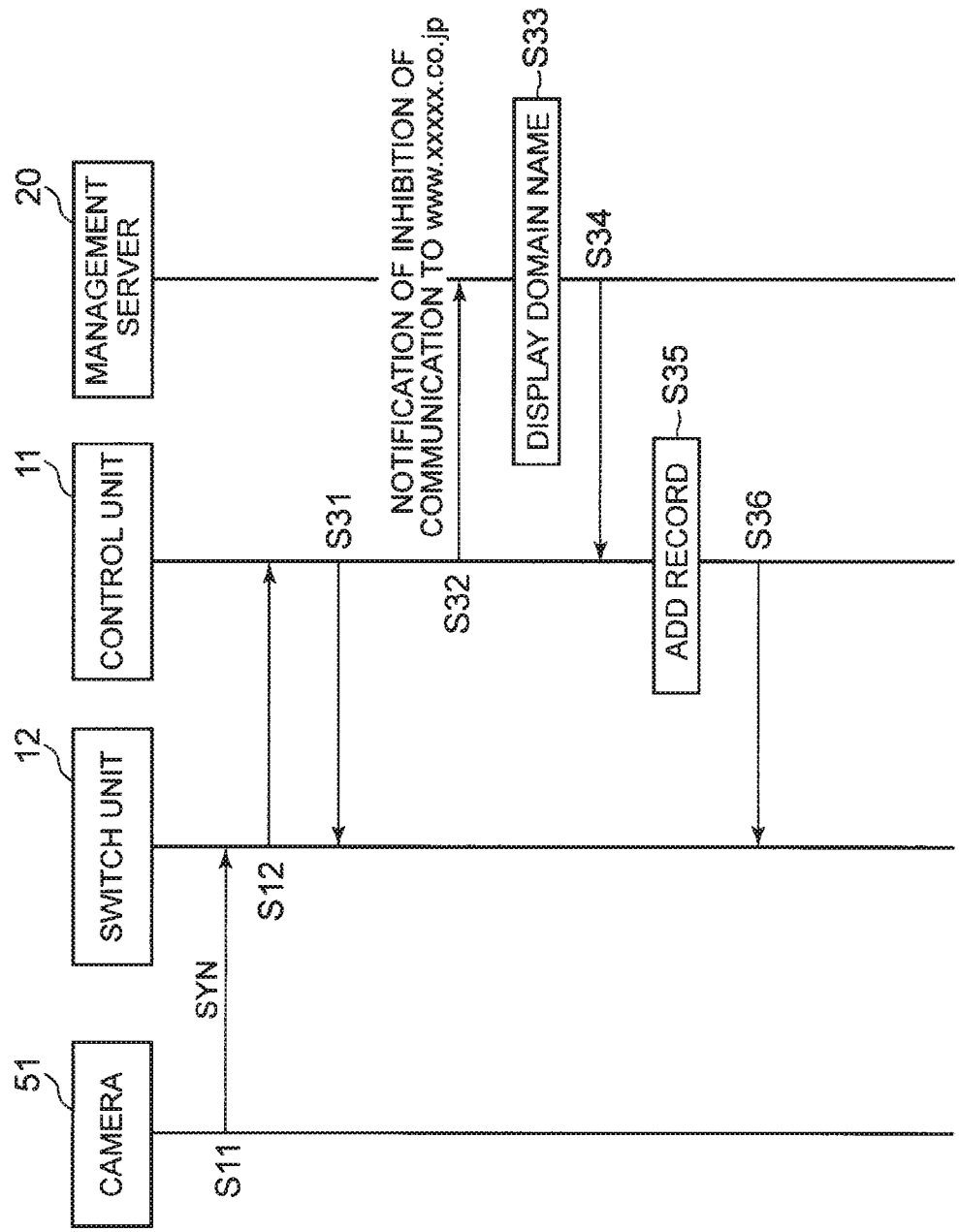
FIG. 8 It depicts a sequence diagram showing an example of a processing progress in a case of setting control information indicating inhibition of communication since a domain name specified from a destination IP address is not included in a list.

FIG. 8 is a sequence diagram showing an example of a processing progress in a case of setting control information indicating inhibition of communication since a domain name specified from a destination IP address is not included in a list. In the example shown below, a description is given while assuming that a record corresponding to "www.xxxxx.co.jp" is not included in the list. The following operation is assumed to be an operation immediately after the process shown in FIG. 6 is completed.

The camera 51 transmits a SYN packet with the IP address of the server 30 as a destination (step S11).

The switch unit 12 receives the SYN packet. This SYN packet is a new packet. In this case, the switch unit 12 notifies the control unit 11 of header information of the SYN packet (step S12). Further, the switch unit 12 holds the SYN packet.

The control unit 11 specifies a domain name from a destination IP address included in the header information notified in step S12. In this example, the control unit 11 stores a correspondence between a domain name and an IP address of the server 30, in step S7 (see FIG. 6). The control unit 11 specifies the domain name "www.xxxxx.co.jp" from the destination IP address included in the header information by referring to the correspondence. Furthermore, the control unit 11 determines whether or not the domain name is included in the list. In this example, it is assumed that a record corresponding to "www.xxxxx.co.jp" is not included in the list. Therefore, the control unit 11 determines that "www.xxxxx.co.jp" is not included in the list, and sets, in the switch unit 12, control information defining packet discarding as the control information according to the header information of the SYN packet (step S31). Further, in this case, the control unit 11 does not associate the control information with the record.

The switch unit 12 discards the held SYN packet in accordance with the control information that has been set in step S31.

Further, the control unit 11 notifies the management server 20 of the domain name specified from the destination IP address and contents of the set control information (step S32). For example, the control unit 11 transmits, to the management server 20, information of "communication to www.xxxxx.co.jp is inhibited". Since the information that the communication is inhibited is notified, the management server 20 displays the domain name "www.xxxxx.co.jp" specified from the destination IP address (step S33). As a result, the administrator can consider whether or not to be appropriate that "www.xxxxx.co.jp" has not been included in the list. When the administrator considers that communication to "www.xxxxx.co.jp" should be permitted, the administrator may simply operate the management server 20 to transmit an instruction to add "www.xxxxx.co.jp" to the list, from the management server 20 to the control unit 11.

Specifically, the management server 20 is inputted with, from the administrator, a record in which "www.xxxxx.co.jp" is associated with the communication interface. This record may include supplementary information. In addition, the management server 20 is also inputted with an instruction to add the record to the list, from the administrator. In this case, the management server 20 transmits the inputted record and the instruction to add the record to the list, to the control unit 11 (step S34).

When receiving the record and the above instruction, the control unit 11 adds the received record to the list in accordance with the instruction (step S35).

Further, the control unit 11 specifies all the control information being not associated with any record in the list and indicating inhibition of communication, designates all the specified control information, and commands the switch unit 12 to delete the control information (step S36). The switch unit 12 deletes the control information designated by the control unit 11 in accordance with the command. In this example, the switch unit 12 deletes the control information that has been set in step S31.

The camera 51 does not receive the SYN_ACK packet, thus transmits the SYN packet at regular intervals. Until the switch unit 12 deletes the control information that has been set in step S31, the SYN packet received by the switch unit 12 is discarded in accordance with the control information. If the switch unit 12 receives the SYN packet after the switch unit 12 deletes the control information that has been set in step S31, each element may simply perform operations in and after step S12 shown in FIG. 7.

The following effects are obtained by the operation of step S36. With only the addition of the record in step S35, the SYN packet transmitted by the camera 51 at regular intervals is discarded in accordance with the control information that has been set in step S31. If this state continues for a long time, the transmission source of the SYN packet transmits a SYN packet by changing a part of the header information (for example, transmission source port information). By changing a part of the header information, the SYN packet is determined to be a new packet. As a result, on the basis of the list after addition of the record, the operations in and after step S12 shown in FIG. 7 are performed. However, in this case, even if the record is added in step S35, it takes time until control information indicating permission of communication is set. Whereas, as described above, when the switch unit 12 deletes the control information that has been set in step S31 by the operation of step S36, the operations in and after step S12 shown in FIG. 7 can be started from when the SYN packet is received thereafter. Therefore, it is possible to shorten the time until the control information indicating permission of communication is set after the record is added to the list.

Meanwhile, if the administrator considers to be appropriate that "www.xxxxx.co.jp" has not been included in the list, the administrator may simply not instruct to add the record to the list. In this case, the processes of steps S34 to S36 are not performed. Therefore, the control information that has been set in step S31 is not deleted, and the SYN packet transmitted by the camera 51 at regular intervals is discarded in accordance with the control information.

Figure 9:
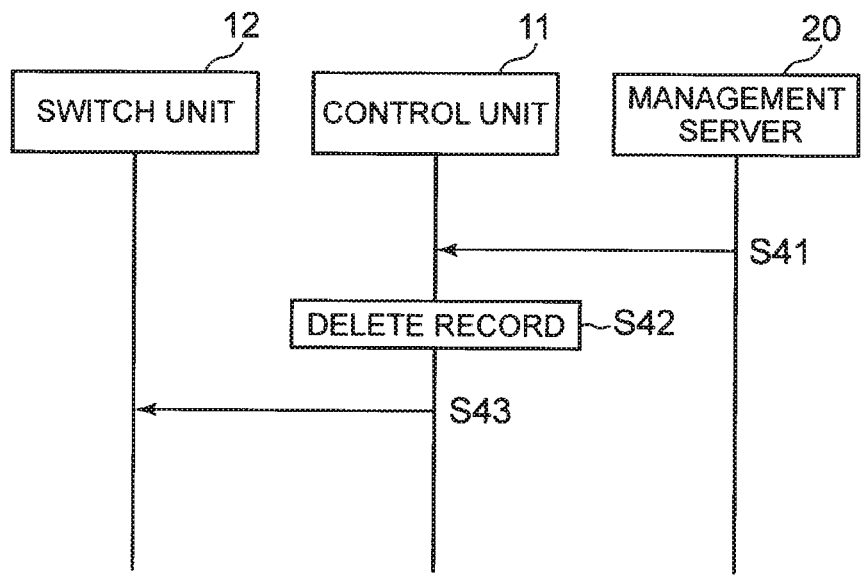
FIG. 9 It depicts a sequence diagram showing an example of a processing progress when a record in a list is deleted.

FIG. 9 is a sequence diagram showing an example of a processing progress when a record in a list is deleted.

When the administrator determines that there is a record to be deleted among the records in the list held by the control unit 11, the administrator may simply operate the management server 20 to transmit an instruction to delete the record designated by the administrator from the list, from the management server 20 to the control unit 11. Note that deleting a designated record from the list means deleting a designated item (in the present exemplary embodiment, a domain name) from the list.

The management server 20 is inputted with, from the administrator, information of a record designated by the administrator as a record to be deleted. Further, the management server 20 is also inputted with an instruction to delete a designated record from the list, from the administrator. In this case, the administrator transmits information of the designated record and the instruction to delete the designated record from the list, to the control unit 11 (step S41).

Meanwhile, a timing at which the administrator causes the management server 20 to transmit the instruction for record deletion may be any timing.

When receiving the record and the above instruction, the control unit 11 deletes the designated record from the list in accordance with the instruction (step S42).

Further, the control unit 11 specifies all the control information associated with the deleted record, designates all the specified control information, and commands the switch unit 12 to delete the control information (step S43). The switch unit 12 deletes the control information designated by the control unit 11 in accordance with the command.

For example, suppose that the control unit 11 receives an instruction to delete the first record shown in FIG. 4 and deletes the record from the list. In this case, the control unit 11 specifies the control information that has been set in steps S13 and S18 (see FIG. 7) in the above-mentioned example, and commands the switch unit 12 to delete the control information. The switch unit 12 deletes the individual control information that has been set in steps S13 and S18 in accordance with the command.

After that, even if the control unit 11 specifies "www.xxxxx.co.jp" from the destination IP address, control information indicating inhibition of communication is set in the switch unit 12 since the record corresponding to this domain name is not included in the list.

According to the present exemplary embodiment, when having received notification of header information of a new packet, the control unit 11 specifies a domain name from a destination IP address included in the header information. Then, the control unit 11 sets control information indicating permission of communication in the switch unit 12 when the record corresponding to the domain name is included in the list, and sets control information indicating inhibition of communication in the switch unit 12 when the record corresponding to the domain name is not included in the list. Therefore, the administrator can use the list to set whether or not to permit communication. Further, the list is a list in which records describing a domain name and a communication interface are listed. Therefore, the administrator only needs to designate a domain name and a communication interface in the list, and does not need to designate an IP address that is difficult for the administrator to grasp. Therefore, the administrator can easily set whether or not to permit communication.

Further, in the first exemplary embodiment, when newly storing a record in which a domain name, an IP address, and a valid period are associated with each other in step S7, the control unit 11 may also include a transmission source MAC address of the DNS query in the record. That is, in step S7, the control unit 11 may newly store a record in which a domain name, an IP address, a transmission source MAC address of the DNS query, and a valid period are associated with each other.

In this case, when specifying a domain name from a destination IP address included in the header information received from the switch unit 12, the control unit 11 specifies a domain name corresponding to a combination of the destination IP address and the transmission source MAC address included in the header information. At this time, even if the destination IP address included in the header information matches the IP address stored as the correspondence between a domain name and an IP address, the control unit 11 cannot specify the domain name if the transmission source MAC address included in the header information does not match the transmission source MAC address included in the correspondence. In this case, the control unit 11 sets control information indicating inhibition of communication in the switch unit 12 as control information according to the header information.

For example, suppose that a MAC address of the gateway 10 is "01:01:01:01:01:01". Further, suppose that the process A 13 transmits a DNS query including a domain name "www.ttttt.co.jp", and the DNS server 40 returns a DNS query response including an IP address "10.y.y.y" corresponding to "www.ttttt.co.jp". In this case, in step S7, the control unit 11 associates and stores the domain name "www.ttttt.co.jp", the IP address "10.y.y.y", the MAC address "01:01:01:01:01:01", and a valid period. Further, suppose that a MAC address of the sensor 52 (see FIG. 2) is "02:02:02:02:02:02". Then, the sensor 52 transmits a packet whose destination IP address is "10.y.y.y" and whose transmission source MAC address is "02:02:02:02:02:02", and the switch unit 12 notifies the control unit 11 of header information of this packet. At this time, the control unit 11 determines that there is no domain name corresponding to the combination of the destination IP address "10.y.y.y" and the transmission source MAC address "02:02:02:02:02:02". Then, the control unit 11 sets control information indicating inhibition of communication in the switch unit 12, as control information according to the header information of the packet transmitted by the sensor 52. As a result, communication from the sensor 52 whose MAC address is "02:02:02:02:02:02" to the IP address "10.y.y.y" is inhibited.

Second Exemplary Embodiment

Figure 10:
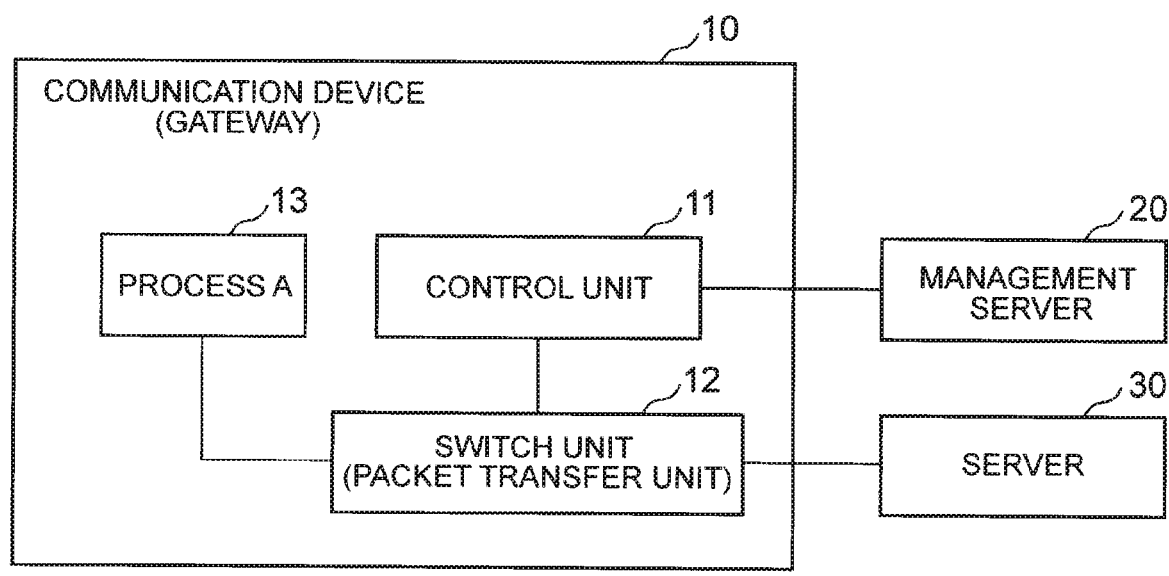
FIG. 10 It depicts a block diagram showing an example of a second exemplary embodiment of the communication system of the present invention.

FIG. 10 is a block diagram showing an example of a second exemplary embodiment of the communication system of the present invention. Elements similar to the elements shown in FIG. 2 are assigned with the same reference numerals as in FIG. 2. However, an operation of a control unit 11 is partially different from the operation of the control unit 11 in the first exemplary embodiment.

Further, only a process A 13 is illustrated as an internal process of a gateway 10 in FIG. 10, but the number of internal processes of the gateway 10 is not particularly limited. In the example shown below, a case where the process A 13 transmits a packet whose destination is a server 30 will be described as an example. Note that, in the following description, in order to simplify the description, the description is given while assuming that a process is to operate. However, in practice, a CPU is to operate in accordance with the process.

A switch unit 12 is similar to the switch unit 12 in the first exemplary embodiment.

In the second exemplary embodiment, a process name is used as an item that can be specified from an IP address. Therefore, in the second exemplary embodiment, the control unit 11 holds a list of process names as a list of items that can be specified from an IP address. The process name described in the list is described along with a process path name. Thus, processes are distinguished by the process name described along with the process path name. In the following, unless otherwise stated, the process name is a process name described along with a process path name.

Similarly to the first exemplary embodiment, the list is in principle a white list. The control unit 11 specifies a process name (a process name described with a process path name) from an IP address and a port number (in the present exemplary embodiment, a destination IP address and a destination port number) and the protocol included in header information notified from the switch unit 12. When the process name is included in the list, the control unit 11 sets, in the switch unit 12, control information indicating permission of communication. Further, when the process name is not included in the list, the control unit 11 sets, in the switch unit 12, control information indicating inhibition of communication.

Further, even when the specified process name is included in the list, if supplementary information is described for the process name in the list, the control unit 11 determines, on the basis of the supplementary information, whether to set control information indicating permission of communication or to set control information indicating inhibition of communication.

FIG. 11 is an explanatory view showing an example of a list in the second exemplary embodiment. In the list illustrated in FIG. 11, combinations of a process name, a communication interface, and supplementary information are listed. One combination of a process name, a communication interface, and supplementary information corresponds to one record. The communication interface represents a communication interface to be used for packet output when communication is permitted since a process name in the list is specified from header information.

Further, in the present exemplary embodiment, a description is given to a case, as an example, where the internal process A 13 of the gateway 10 transmits a packet with the server 30 as a destination. Correspondingly, FIG. 11 shows a communication interface to a destination side as the communication interface. Further, in order to process packets from an external device to the internal process of the gateway 10, a record including a communication interface for output of an externally received packet may be described instead of the communication interface to the destination side.

The supplementary information in the record is information indicating an exception when a process name in the list is specified from header information (that is, when the communication is inhibited) or a condition for permitting the communication. The supplementary information of the second record shown in FIG. 11 defines that communication is permitted only when the condition "destination IP address is 192.168.10.0.24 and a destination port number is 443 or 80" is satisfied even when "/sbin/xyz" is specified from header information. Further, the supplementary information of the third record shown in FIG. 11 indicates that the communication is not permitted even when "/bin/abc" is specified from header information, if the port number is 20 or 21.

Note that, in FIG. 11, an IP address "192.168.10.0/24" is described in the supplementary information. In general, an IP address is difficult for an administrator to grasp. However, when the administrator has grasped an IP address, the administrator may describe the IP address in the supplementary information as illustrated in FIG. 11.

In the first record shown in FIG. 11, supplementary information is not described. Therefore, when "/usr/bin/abc" is specified from header information, the control unit 11 sets control information indicating permission of communication without considering exceptions and conditions.

As described in the first exemplary embodiment, the list is created in advance by the administrator of the communication system. The management server 20 transmits the list to the control unit 11 of the gateway 10 in accordance with an operation of the administrator, and the control unit 11 holds the received list.

Next, a process in which the control unit 11 specifies a process name from an IP address included in header information will be described. The control unit 11 specifies a process name from a destination IP address, a destination port number, and a protocol included in header information. This method may be a known method. Hereinafter, an example of an operation for the control unit 11 to specify a process name will be described.

The control unit 11 acquires a destination IP address, a destination port number, and a protocol from header information notified from the switch unit 12.

Then, using the destination IP address and the destination port number as keys, the control unit 11 searches for an i node number used by the process for socket communication. For example, a CPU of the gateway 10 describes a correspondence of a destination IP address and a destination port number with an i node number, in a predetermined file corresponding to the protocol. The control unit 11 searches a file for the i node number by using the destination IP address and the destination port number as keys. The control unit 11 may simply specify the file to be searched for the i node number, on the basis of the protocol acquired from the header information.

Next, the control unit 11 detects a process ID corresponding to the i node number. For example, the CPU describes a correspondence between an i node number and a process ID in files under the predetermined multiple paths. The control unit 11 detects a process ID corresponding to the i node number from those files.

Next, using the process ID as a key, the control unit 11 searches for a process name itself (a process name with which a process path name is not described) and a process path name of the process. For example, the CPU describes a correspondence between a process name itself and a process ID in a predetermined file (referred to as a first file) corresponding to the process ID. Further, the CPU describes a correspondence between a process ID and a process path in another predetermined file (referred to as a second file) corresponding to the process ID. The control unit 11 searches for a process name itself from the first file with the process ID as a key, and searches for a process path name from the second file with the process ID as a key.

Next, the control unit 11 connects the process path name and the process name that have been searched for. As a result, the process path name described along with the process path name is specified.

When having set control information in the switch unit 12 since the list includes the process name specified from the destination IP address, the destination port number, and the protocol, the control unit 11 stores a correspondence between the process name and the control information included in the list. For example, the control unit 11 associates and stores the control information and the record in the list that has been referred to in determining the control information.

For example, suppose that the control unit 11 specifies a process name from the destination IP address, the destination port number, and the protocol, and sets control information indicating permission of communication on the basis of the fact that the process name is included in the list. Meanwhile, at this time, the control unit 11 may set control information indicating inhibition of communication in accordance with supplementary information associated with the process name in the list. In this case, the control unit 11 associates and stores a record corresponding to the process name in the list and the set control information.

Whereas, when having set control information indicating inhibition of communication since the list does not include the process name specified from the destination IP address, the destination port number, and the protocol, the control unit 11 does not store the above correspondence. In other words, since the specified process name is not included in the list, the control unit 11 cannot associate the process name in the list (record corresponding to the specified process name in the list) with the control information.

Further, similarly to the first exemplary embodiment, when having set control information in the switch unit 12, the control unit 11 transmits an item (a process name in the present exemplary embodiment) specified when setting the control information, and contents of the control information, to the management server 20. The management server 20 holds these pieces of information received from the control unit 11 as log information.

The management server 20 is similar to the management server 20 in the first exemplary embodiment. Further, an operation of the control unit 11 when having received an instruction from the management server 20 is also similar to the operation of the control unit 11 in the first exemplary embodiment.

Next, an example of a processing progress of the second exemplary embodiment will be described.

Figure 12:
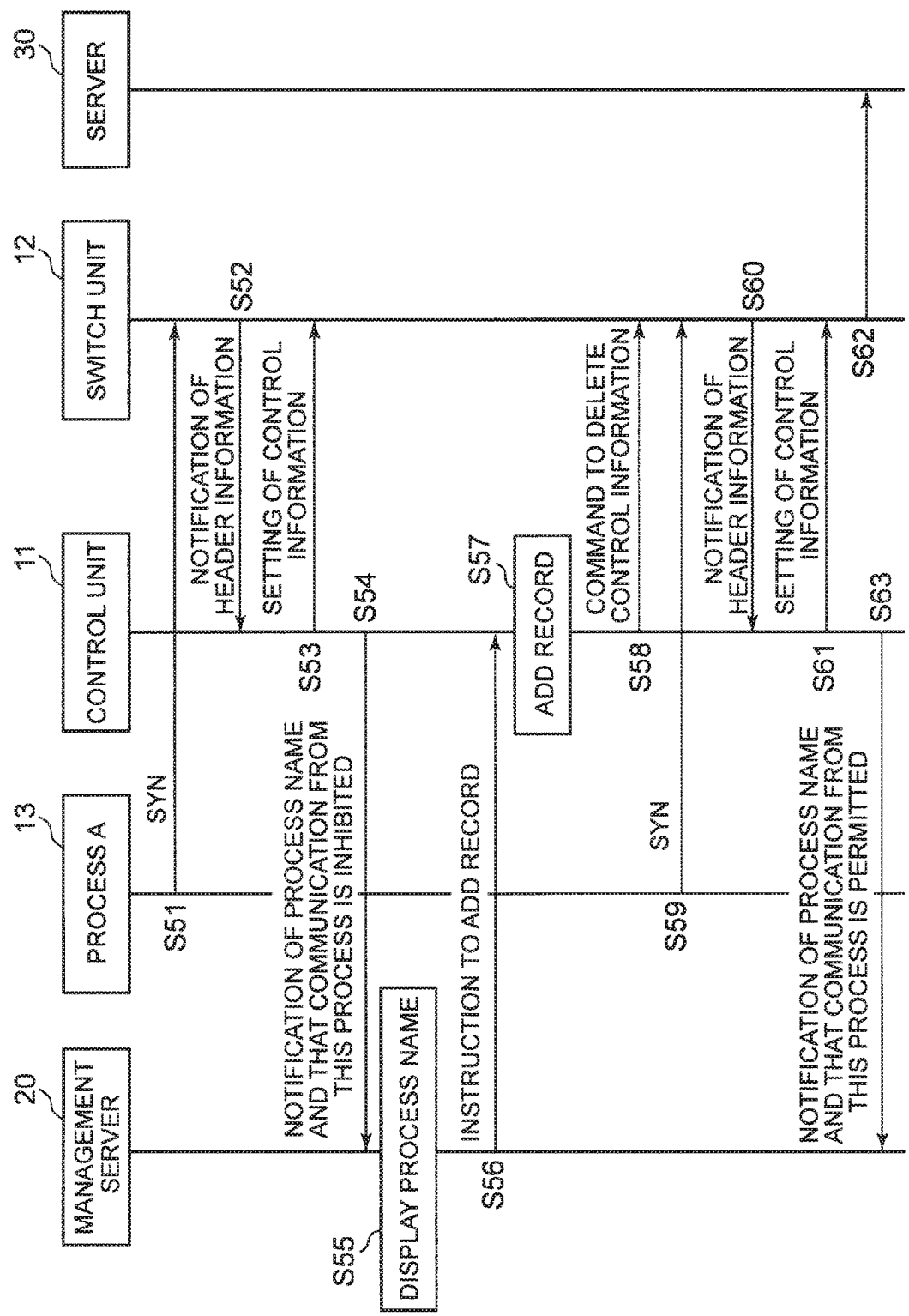
FIG. 12 It depicts a sequence diagram showing an example of a processing progress in a case of setting control information indicating inhibition of communication since a process name specified from header information is not included in a list.

FIG. 12 is a sequence diagram showing an example of a processing progress in a case of setting control information indicating inhibition of communication since a process name specified from header information is not included in the list. In the example shown below, a case where the process A 13 is a packet transmission source will be described as an example. Further, in the following description, at a time when the process A 13 transmits a SYN packet in step S51 (see FIG. 12), a record corresponding to the process name of the process A 13 is not included in the list held by the control unit 11.

Further, in the following description, a description is given to a case, as an example, where the control unit 11 sets, in the switch unit 12, control information according to a combination of a destination IP address, a destination port number, a transmission source IP address, and a transmission source port number included in header information. Therefore, in this example, specifically, control information conforming to header information is control information conforming to the combination of the destination IP address, the destination port number, the transmission source IP address, and the transmission source port number included in the header information.

The internal process A 13 of the gateway 10 transmits a SYN packet whose destination is the server 30 (step S51). A destination IP address, a destination port number, a transmission source IP address, and a transmission source port number each included in header information of this SYN packet are as shown below.

Destination IP address: 192.168.0.1
Destination port number: 443
Transmission source IP address: 192.168.10.1
Transmission source port number: 5000

The switch unit 12 receives this SYN packet. This SYN packet is assumed to be a new packet. That is, it is assumed that control information conforming to header information of this SYN packet (specifically, a combination of the destination IP address "192.168.0.1", the destination port number "443", the transmission source IP address "192.168.10.1", and the transmission source port number "5000") has not been set in the switch unit 12 yet. In this case, the switch unit 12 notifies the control unit 11 of header information of the SYN packet (step S52). Further, the switch unit 12 holds the SYN packet received from the process A 13.

Meanwhile, in the present exemplary embodiment, an aspect of sending header information of a packet by the switch unit 12 may be an aspect of sending a copy of the packet to the control unit 11, or may be an aspect of sending only a header information part of the packet to the control unit 11.

The control unit 11 specifies a process name (a process path name described along with a process path name) of the process A 13 that has transmitted the SYN packet, from the destination IP address, the destination port number, and the protocol included in the header information notified in step S52. Since an example of the method of specifying the process name has already been described, the description is omitted here.

Next, the control unit 11 determines whether or not the specified process name is included in the list. Here, the specified process name is not included in the list. Therefore, the control unit 11 sets control information defining packet discarding in the switch unit 12, as control information according to the header information of the SYN packet (specifically, the destination IP address, the destination port number, the transmission source IP address, and the transmission source port number described above) (step S53). In this case, the control unit 11 does not associate the control information with a record in the list.

The switch unit 12 discards the held SYN packet in accordance with the control information that has been set in step S53.

Further, the control unit 11 notifies the management server 20 of the process name (the process name of the process A 13) specified from the destination IP address, the destination port number, and the protocol, and contents of the set control information (step S54). For example, the control unit 11 notifies the management server 20 of the specified process name and that communication from the process is inhibited. Since the information indicating that communication is inhibited is notified, the management server 20 displays the notified process name (step S55). As a result, the administrator can consider whether or not to be appropriate that the process name has not been included in the list. When the administrator considers that communication from the process having the process name should be permitted, the administrator may simply operate the management server 20 to transmit an instruction to add the process name to the list, from the management server 20 to the control unit 11.

Specifically, the management server 20 is inputted with, from the administrator, a record in which the process name (the process name of the process A 13) is associated with the communication interface to the destination side. This record may include supplementary information. In addition, the management server 20 is also inputted with an instruction to add the record to the list, from the administrator. In this case, the management server 20 transmits the inputted record and the instruction to add the record to the list, to the control unit 11 (step S56).

When receiving the record and the above instruction, the control unit 11 adds the received record to the list in accordance with the instruction (step S57).

Further, the control unit 11 specifies all the control information being not associated with any record in the list and indicating inhibition of communication, designates all the specified control information, and commands the switch unit 12 to delete the control information (step S58). The switch unit 12 deletes the control information designated by the control unit 11 in accordance with the command. In this example, the switch unit 12 deletes the control information that has been set in step S53.

Since the process A 13 does not receive a response (SYN_AKC packet) to the SYN packet, the process A 13 transmits the SYN packet at regular intervals. Until the switch unit 12 deletes the control information that has been set in step S53, the SYN packet received by the switch unit 12 is discarded in accordance with the control information.

As described above, when there is no response, the process A 13 transmits the SYN packet at regular intervals. Therefore, even after the control information that has been set in step S53 is deleted, the process A 13 transmits the SYN packet again (step S59). The switch unit 12 receives the SYN packet. Control information conforming to header information of this SYN packet (specifically, a combination of the destination IP address "192.168.0.1", the destination port number "443", the transmission source IP address "192.168.10.1", and the transmission source port number "5000") has been deleted by the switch unit 12 on the basis of the command in step S58. Therefore, the packet received by the switch unit 12 in step S59 corresponds to a new packet.

Consequently, the switch unit 12 notifies the control unit 11 of the header information of the SYN packet received in step S59 (step S60). Further, the switch unit 12 holds the SYN packet.

The control unit 11 specifies a process name of the process A 13 that has transmitted the SYN packet, from the destination IP address, the destination port number, and the protocol included in the header information notified in step S60.

Next, the control unit 11 determines whether or not the specified process name is included in the list. In step S57, a record corresponding to the process name of the process A 13 has been added to the list. Therefore, the control unit 11 determines that the specified process name is included in the list.

Consequently, the control unit 11 sets, in the switch unit 12, control information defining that the packet is to be outputted from the communication interface described in the record, as control information according to the header information of the SYN packet (specifically, the destination IP address, the destination port number, the transmission source IP address, and the transmission source port number described above) (step S61). Further, at this time, the control unit 11 associates and stores a record corresponding to the specified process name in the list and the control information.

The switch unit 12 outputs the held SYN packet from the communication interface defined by the control information in accordance with the control information that has been set in step S61 (step S62). As a result, the server 30 receives the SYN packet.

Further, the control unit 11 notifies the management server 20 of the specified process name (the process name of the process A 13) and contents of the set control information (step S63). For example, the management server 20 is notified of the specified process name and that communication from the process is permitted. When receiving the process name together with the information of "communication is permitted", the management server 20 need not display the process name.

In FIG. 12, the case is shown where control information indicating inhibition of communication is set since the process name specified from the header information is not included in the list. An operation in a case of setting control information indicating permission of communication since the process name specified from the header information is included in the list is similar to the operations in and after step S59 shown in FIG. 12. Note that, even when the process name specified from the header information is included in the list, there may be a case where the control unit 11 sets control information indicating inhibition of communication in accordance with supplementary information.

By the operation of step S58 shown in FIG. 12, an effect similar to the operation of step S36 (see FIG. 8) is obtained. With only the addition of the record in step S57, the SYN packet transmitted by the process A 13 at regular intervals is discarded in accordance with the control information that has been set in step S53. If this state continues for a long time, the process A 13 transmits a SYN packet by changing a part of the header information (transmission source port information). By changing the transmission source port information, the SYN packet is determined to be a new packet. As a result, on the basis of the list after addition of the record, the operations in and after step S60 are performed. However, in this case, even if the record is added in step S57, it takes time until control information indicating permission of communication is set. Whereas, when the switch unit 12 deletes the control information that has been set in step S53 by the operation of step S58, the operations in and after step S60 can be started from when the SYN packet is received thereafter. Therefore, it is possible to shorten the time until the control information indicating permission of communication is set after the record is added to the list.

Figure 13:
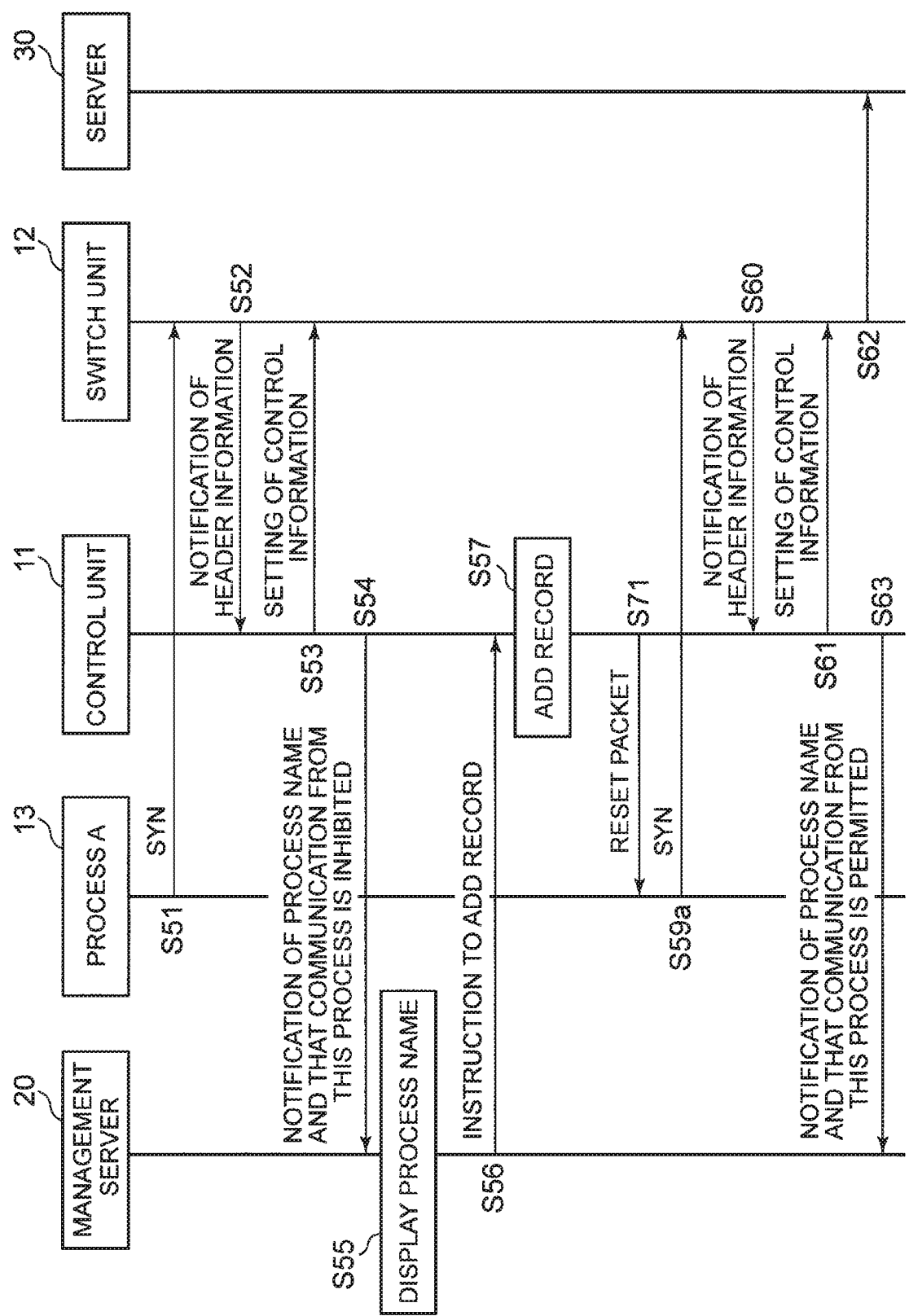
FIG. 13 It depicts a sequence diagram showing another example of a processing progress that can shorten a time until control information indicating permission of communication is set after a record is added to a list.

An example of another processing progress that can obtain this effect will be described. FIG. 13 is a sequence diagram showing another example of a processing progress that can shorten a time until the control information indicating permission of communication is set after a record is added to the list. Operations similar to the operation shown in FIG. 12 are given with the same step numbers as FIG. 12.

The processing progress of step S51 to step S57 is similar to the processing progress of step S51 to S57 shown in FIG. 12. In the example shown in FIG. 13, the control unit 11 does not perform the operation of step S58. Instead, when a new record is added in accordance with an instruction from the management server 20, the control unit 11 transmits a reset packet to a packet transmission source (in this example, the process A 13). Note that the control unit 11 transmits the reset packet to the packet transmission source without passing through the switch unit 12.

The reset packet is a packet to give an instruction to stop transmission of a packet being repeatedly transmitted due to the absence of a response from a destination, and to give an instruction to transmit a packet in which a part of header information (here, a transmission source port number) of the packet has been changed.

After adding a new record in accordance with the instruction from the management server 20 (after step S57), the control unit 11 transmits the reset packet to the process A 13 (step S71).

Then, the process A 13 follows the instruction of the reset packet received from the control unit 11. That is, the process A 13 stops the transmission of the SYN packet that has been repeated due to the absence of response to the SYN packet. Then, the process A 13 transmits the SYN packet in which the transmission source port number has been changed among the header information of the SYN packet having been repeatedly transmitted (step S59a). A destination IP address, a destination port number, a transmission source IP address, and a transmission source port number each included in header information of this SYN packet are as shown below.

Destination IP address: 192.168.0.1
Destination port number: 443
Transmission source IP address: 192.168.10.1
Transmission source port number: 5001

The switch unit 12 receives this SYN packet. The transmission source port number of this SYN packet is different from the transmission source port number of the SYN packet received in step S51. Therefore, the header information of the SYN packet received by the switch unit 12 in step S59a does not conform to the control information that has been set in step S53. Consequently, the SYN packet corresponds to a new packet.

Therefore, the switch unit 12 notifies the control unit 11 of header information of the SYN packet received in step S59a (step S60). The processing progress of step S60 to step S63 is similar to the processing progress of step S60 to S63 shown in FIG. 12.

In the example shown in FIG. 13, when a new record is added in accordance with an instruction from the management server 20, the control unit 11 transmits a reset packet to the process A 13. Then, the process A 13 stops transmission of the SYN packet that has been repeatedly transmitted until then, and transmits, to the switch unit 12, a SYN packet whose transmission source port number is different from that of the SYN packet. As a result, the operations in and after step S60 can be started from a time when the switch unit 12 receives the SYN packet. Therefore, it is possible to shorten the time until the control information indicating permission of communication is set after the record is added to the list.

Note that, for realizing the processing progress shown in FIG. 13, the administrator defines in advance, for each process of the gateway 10, an operation at the time of receiving the reset packet.

Thus, the technical matter that the control unit 11 transmits a reset packet to a packet transmission source when a new record is added in accordance with an instruction from the management server 20 is also applicable to the first exemplary embodiment and the third exemplary embodiment described later.

Note that, in the examples shown in FIGS. 12 and 13, if the administrator considers to be appropriate that the process name displayed in step S55 has not been included in the list, the administrator may simply not instruct to add a record to the list. In this case, in the examples shown in FIGS. 12 and 13, the process in and after step S56 is not performed. Therefore, the SYN packet transmitted by the process A 13 at regular intervals is discarded in accordance with the control information that has been set in step S53.

Further, the processing progress in a case of deleting a record in the list is similar to the operation described in the first exemplary embodiment (the operation described with reference to FIG. 9).

According to the present exemplary embodiment, when having received notification of header information of a new packet, the control unit 11 specifies a process name by using a destination IP address included in the header information. Then, the control unit 11 sets control information indicating permission of communication in the switch unit 12 when the record corresponding to the process name is included in the list, and sets control information indicating inhibition of communication in the switch unit 12 when the record corresponding to the domain name is not included in the list. Therefore, the administrator can use the list to set whether or not to permit communication. Further, the list is a list in which records describing a process name and a communication interface are listed. Therefore, the administrator only needs to designate a process name and a communication interface in the list, and does not need to designate an IP address that is difficult for the administrator to grasp. Therefore, the administrator can easily set whether or not to permit communication.

Further, in the second exemplary embodiment, a process name described in the list need not be described along with a process path name. That is, a process name described in the list may be a process name itself. In this case, when having received header information from the switch unit 12, the control unit 11 may simply specify a process name of a process that has transmitted the packet, from the destination IP address, the destination port number, and the protocol included in the header information, and there is no need to search for the process path name.

Third Exemplary Embodiment

Since a communication system of a third exemplary embodiment of the present invention can be represented by a block diagram shown in FIG. 10 similarly to the communication system of the second exemplary embodiment, the third exemplary embodiment will be described with reference to FIG. 10.

A switch unit 12, a process A 13, a management server 20, and a server 30 in the third exemplary embodiment are similar to the switch unit 12, the process A 13, the management server 20, and the server 30 in the second exemplary embodiment.

In the third exemplary embodiment, a user name of a process is used as an item that can be specified from an IP address. Therefore, in the third exemplary embodiment, a control unit 11 holds a list of user names of a process (hereinafter, simply referred to as user names) as a list of items that can be specified from an IP address.

Similarly to the first and second exemplary embodiments, the list is in principle a white list. The control unit 11 specifies a user name from an IP address and a port number (in the present exemplary embodiment, a destination IP address and a destination port number) and a protocol included in header information notified from the switch unit 12. When the user name is included in the list, the control unit 11 sets, in the switch unit 12, control information indicating permission of communication. Further, when the user name is not included in the list, the control unit 11 sets, in the switch unit 12, control information indicating inhibition of communication.

Further, even when the specified user name is included in the list, if supplementary information is described for the user name in the list, the control unit 11 determines, on the basis of the supplementary information, whether to set control information indicating permission of communication or to set control information indicating inhibition of communication.

Figures 14, 15:
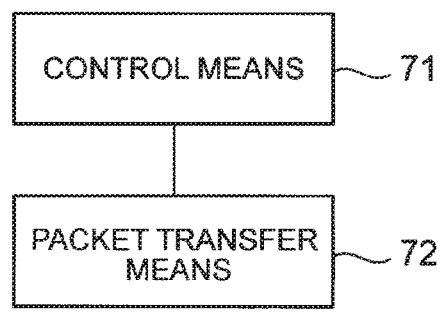
FIG. 14 It depicts an explanatory view showing an example of a list in a third exemplary embodiment.
FIG. 15 It depicts a block diagram showing an outline of the communication system of the present invention.

FIG. 14 is an explanatory view showing an example of a list in the third exemplary embodiment. In the list illustrated in FIG. 14, combinations of a user name, a communication interface, and supplementary information are listed. One combination of a user name, a communication interface, and supplementary information corresponds to one record. The communication interface represents a communication interface to be used for packet output when communication is permitted since a user name in the list is specified from header information.

Further, here, a description is given to a case, as an example, where the internal process A 13 of a gateway 10 transmits a packet with the server 30 as a destination. Correspondingly, FIG. 14 shows a communication interface to a destination side as the communication interface. Further, in order to process packets from an external device to the internal process of the gateway 10, a record including a communication interface for output of an externally received packet may be described instead of the communication interface to the destination side.

Supplementary information is similar to the supplementary information in the second exemplary embodiment.

Further, in the present exemplary embodiment, the control unit 11 specifies a user name from a destination IP address, a destination port number, and a protocol included in header information. Hereinafter, an example of an operation for the control unit 11 to specify a user name will be described.

The control unit 11 acquires a destination IP address, a destination port number, and a protocol from header information notified from the switch unit 12. Next, using the destination IP address and the destination port number as keys, the control unit 11 searches for an i node number used by the process for socket communication. Next, the control unit 11 detects a process ID corresponding to the i node number. These operations are similar to the operations described in the second exemplary embodiment. As exemplified in the second exemplary embodiment, the control unit 11 may simply determine a file to be searched for the i node number, on the basis of the protocol acquired from the header information.

Next, the control unit 11 acquires a user name (execution user name) of the process with the process ID as a key, by using a command for displaying the process being executed.

The third exemplary embodiment is different from the second exemplary embodiment in that the control unit 11 holds a list of user names and specifies a user name from an IP address and a port number. Other points are similar to those in the second exemplary embodiment, and the description will be omitted.

According to the third exemplary embodiment, the administrator only needs to designate a user name and a communication interface in the list, and does not need to designate an IP address that is difficult for the administrator to grasp. Therefore, similarly to the second exemplary embodiment, the administrator can easily set whether or not to permit communication.

In each of the above-described exemplary embodiments, a description is given to a case, as an example, where the management server 20 does not display the information when the management server 20 receives the specified item and the information that "communication is permitted". The management server 20 may display those pieces of information. Then, when the administrator sees the display and determines that the record corresponding to the item should be deleted from the list, the administrator may cause the management server 20 to transmit an instruction to delete the record. An operation in this case is similar to the operation described with reference to FIG. 9.

Further, the management server 20 in each of the above exemplary embodiments can also be referred to as a management means. The management means may be an information processing apparatus (for example, a personal computer or the like) having a function similar to that of the management server 20, rather than a server. Further, instead of providing the management server 20 outside the gateway 10, the gateway 10 may be provided with the management means. That is, the gateway 10 may be provided with a means having a function similar to that of the management server 20.

Further, in each of the above-described exemplary embodiments, the list may include a record in which an item is associated with supplementary information that clearly indicates that communication is not permitted for the item. For example, the list illustrated in FIG. 11 may include a record in which a process name "/bin/efg" is associated with supplementary information indicating "communication is not permitted". In this case, when a process name specified from an IP address is "/bin/efg", the control unit 11 sets control information indicating inhibition of communication in the switch unit 12, on the basis of the supplementary information. Note that the communication interface may not be designated in this record. Here, a case where the item is a process name has been described as an example, but the exceptional record as described above may be included in the list even when the item is a domain name or a user name.

Further, in each exemplary embodiment, when the packet received by the switch unit 12 is a new packet, the switch unit 12 may send header information of the received packet to the control unit 11 as follows. The switch unit 12 may send the entire packet to the control unit 11 without holding the received packet. In this case, the control unit 11 returns the packet to the switch unit 12 when setting, in the switch unit 12, control information according to the header information of the packet. The switch unit 12 may simply process the packet returned from the control unit 11 in accordance with the control information.

Next, an outline of the present invention will be described. FIG. 15 is a block diagram showing an outline of the communication system of the present invention. The communication system of the present invention includes: a packet transfer means 72 to transfer a packet; and a control means 71 to set, in the packet transfer means 72, control information defining an operation of the packet transfer means 72 according to header information of a packet.

When having received a new packet, which is a packet for which control information conforming to header information has not been set yet, the packet transfer means 72 (for example, the switch unit 12) notifies the control means 71 of header information of the new packet.

The control means 71 (for example, the control unit 11) holds a list of items (for example, a domain name, a process name, or a user name of a process) that can be specified from an IP address, and sets control information in the packet transfer means 72 on the basis of an item specified from an IP address included in header information and on the basis of the list, when the header information is notified from the packet transfer means 72.

According to such a configuration, since an IP address need not be designated in the list, the administrator can easily perform setting for communication.

The exemplary embodiments of the present invention described above may also be described as the following supplementary notes, but are not limited to the following.

(Supplementary Note 1)

A communication system including:

a packet transfer means to transfer a packet; and a control means to set, in the packet transfer means, control information defining an operation of the packet transfer means according to header information of a packet, wherein when having received a new packet, which is a packet for which control information conforming to header information has not been set yet, the packet transfer means notifies the control means of header information of the new packet, and the control means holds a list of an item that can be specified from an IP address, and sets control information in the packet transfer means based on an item specified from an IP address included in the header information and based on the list, when the header information is notified from the packet transfer means.

(Supplementary Note 2)

The communication system according to Supplementary note 1, further including a management means (for example, the management server 20) to be operated by an administrator, wherein when having set control information in the packet transfer means, the control means transmits an item specified from an IP address when setting the control information, and a content of the control information, to the management means.

(Supplementary Note 3)

The communication system according to Supplementary note 2, wherein the control means sets control information indicating inhibition of communication by the new packet in the packet transfer means when the list does not include an item specified from an IP address included in header information, and sets control information indicating permission of communication by the new packet in the packet transfer means when the list includes an item specified from an IP address included in the header information; and stores, when having set control information since the list includes an item specified from an IP address included in the header information, a correspondence between the item in the list and the control information, the management means presents, to the administrator, an item specified from an IP address when control information indicating inhibition of communication is set; and transmits, when an instruction to add the item to the list is inputted from the administrator, the instruction to the control means, and the control means adds the item to the list in accordance with the instruction and specifies all control information being not associated with any item in the list and indicating inhibition of communication, and commands the packet transfer means to delete all specified control information.

(Supplementary Note 4)

The communication system according to Supplementary note 2, wherein the control means sets control information indicating inhibition of communication by the new packet in the packet transfer means when the list does not include an item specified from an IP address included in header information, and sets control information indicating permission of communication by the new packet in the packet transfer means when the list includes an item specified from an IP address included in the header information, the management means presents, to the administrator, an item specified from an IP address when control information indicating inhibition of communication is set; and transmits, when an instruction to add the item to the list is inputted from the administrator, the instruction to the control means, and the control means adds the item to the list in accordance with the instruction, and transmits a predetermined packet (for example, a reset packet) giving an instruction to stop transmission of a packet being repeatedly transmitted due to absence of a response from a destination, and to transmit a packet in which a part of header information of the packet has been changed, to a packet transmission source.

(Supplementary Note 5)

The communication system according to any one of Supplementary notes 2 to 4, wherein the control means sets control information indicating inhibition of communication by the new packet in the packet transfer means when the list does not include an item specified from an IP address included in header information, and sets control information indicating permission of communication by the new packet in the packet transfer means when the list includes an item specified from an IP address included in the header information; and stores, when having set control information since the list includes an item specified from an IP address included in the header information, a correspondence between the item in the list and the control information, the management means transmits, when an instruction to delete an item designated by the administrator from the list is inputted from the administrator, the instruction to the control means, and the control means deletes the item designated by the administrator from the list in accordance with the instruction, specifies all control information associated with the item, and commands the packet transfer means to delete all specified control information.

(Supplementary Note 6)

The communication system according to any one of Supplementary notes 3 to 5, wherein, when the list includes an item specified from an IP address included in header information, and supplementary information is described for the item in the list, the control means sets, in the packet transfer means, control information indicating inhibition of communication by a packet including the header information, or information indicating permission of communication by a packet including the header information, based on the supplementary information.

(Supplementary Note 7)

The communication system according to any one of Supplementary notes 1 to 6, wherein the control means holds a list of a domain name as the list of an item that can be specified from an IP address;

stores a correspondence between an IP address and a domain name based on a DNS query response when the packet transfer means receives the DNS query response from a DNS server; and specifies, when header information of the new packet is notified from the packet transfer means, a domain name corresponding to an IP address included in the header information by referring to a correspondence between an IP address and a domain name.

(Supplementary Note 8)

The communication system according to Supplementary note 7, wherein the control means stores the correspondence between an IP address and a domain name based on the DNS query response when the packet transfer means receives the DNS query response from the DNS server, and stores a valid period of the correspondence.

(Supplementary Note 9)

The communication system according to any one of Supplementary notes 1 to 6, wherein the control means holds a list of a process name as the list of an item that can be specified from an IP address; and specifies, when header information of the new packet is notified from the packet transfer means, a process name corresponding to an IP address included in the header information.

(Supplementary Note 10)

The communication system according to any one of Supplementary notes 1 to 6, wherein the control means holds a list of a user name of a process as the list of an item that can be specified from an IP address; and specifies, when header information of the new packet is notified from the packet transfer means, a user name corresponding to an IP address included in the header information.

Although the present invention has been described with reference to the exemplary embodiments above, the present invention is not limited to the above-described exemplary embodiments. Various changes that can be understood by those skilled in the art can be made to the configuration and details of the present invention within the scope of the present invention.

INDUSTRIAL APPLICABILITY

The present invention is suitably applicable to a communication system for transferring a packet.

REFERENCE SIGNS LIST

10 Gateway (communication device)
11 Control unit
12 Switch unit (packet transfer unit)
13 Process A
20 Management server
30 Server
40 DNS server
51 Camera

The invention claimed is:

1. A communication system comprising:
a memory configured to store one or more instructions; and
a processor configured to execute the one or more instructions to implement:
a packet transfer unit to transfer a packet; and
a control unit to set, in the packet transfer unit, control information defining an operation of the packet transfer unit according to header information of a packet, wherein
when having received a new packet that is a packet for which control information conforming to header information has not been set yet, the packet transfer unit notifies the control unit of header information of the new packet, and
the control unit holds a list of an item that can be specified from an IP address, and sets control information in the packet transfer unit based on an item specified from an IP address included in the header information and based on the list, when the header information is notified from the packet transfer unit,
wherein the communication system further comprises:
a management server to be operated by an administrator,
wherein when having set control information in the packet transfer unit, the control unit transmits the item specified from the IP address when setting the control information, and a content of the control information, to the management server,
wherein the control unit:
sets control information indicating inhibition of communication by the new packet in the packet transfer unit when the list does not include the item specified from the IP address included in header information, and sets control information indicating permission of communication by the new packet in the packet transfer unit when the list includes the item specified from the IP address included in the header information; and
stores, when having set control information since the list includes the item specified from the IP address included in the header information, a correspondence between the item in the list and the control information,
the management server transmits, when an instruction to delete an item designated by the administrator from the list is inputted from the administrator, the instruction to the control unit, and
the control unit deletes the item designated by the administrator from the list in accordance with the instruction, specifies all control information associated with the item, and commands the packet transfer unit to delete all specified control information.

2. The communication system according to claim 1, wherein
presents, to the administrator, the item specified from the IP address when control information indicating inhibition of communication is set; and
transmits, when an instruction to add the item to the list is inputted from the administrator, the instruction to the control unit, and
the control unit adds the item to the list in accordance with the instruction and specifies all control information being not associated with any item in the list and indicating inhibition of communication, and commands the packet transfer unit to delete all specified control information.

3. The communication system according to claim 2, wherein
when the list includes the item specified from the IP address included in header information, and supplementary information is described for the item in the list, the control unit sets, in the packet transfer unit, control information indicating inhibition of communication by a packet including the header information, or information indicating permission of communication by a packet including the header information, based on the supplementary information.

4. The communication system according to claim 2, wherein the control unit:
holds a list of a domain name as the list of the item that can be specified from the IP address;
stores a correspondence between an IP address and a domain name based on a domain name system (DNS) query response when the packet transfer unit receives the DNS query response from a DNS server; and
specifies, when header information of the new packet is notified from the packet transfer unit, a domain name corresponding to an IP address included in the header information by referring to a correspondence between an IP address and a domain name.

5. The communication system according to claim 1, wherein
the management server:
presents, to the administrator, the item specified from the IP address when control information indicating inhibition of communication is set; and
transmits, when an instruction to add the item to the list is inputted from the administrator, the instruction to the control unit, and
the control unit adds the item to the list in accordance with the instruction, and transmits a predetermined packet giving an instruction to stop transmission of a packet being repeatedly transmitted due to absence of a response from a destination, and to transmit a packet in which a part of header information of the packet has been changed, to a packet transmission source.

6. The communication system according to claim 5, wherein
when the list includes the item specified from the IP address included in header information, and supplementary information is described for the item in the list, the control unit sets, in the packet transfer unit, control information indicating inhibition of communication by a packet including the header information, or information indicating permission of communication by a packet including the header information, based on the supplementary information.

7. The communication system according to claim 5, wherein the control unit:
holds a list of a domain name as the list of the item that can be specified from the IP address;
stores a correspondence between an IP address and a domain name based on a domain name system (DNS) query response when the packet transfer unit receives the DNS query response from a DNS server; and
specifies, when header information of the new packet is notified from the packet transfer unit, a domain name corresponding to an IP address included in the header information by referring to a correspondence between an IP address and a domain name.

8. The communication system according to claim 1, wherein the control unit:
holds a list of a domain name as the list of the item that can be specified from the IP address;
stores a correspondence between an IP address and a domain name based on a domain name system (DNS) query response when the packet transfer unit receives the DNS query response from a DNS server; and
specifies, when header information of the new packet is notified from the packet transfer unit, a domain name corresponding to an IP address included in the header information by referring to a correspondence between an IP address and a domain name.

9. The communication system according to claim 8, wherein
the control unit stores the correspondence between an IP address and a domain name based on the DNS query response when the packet transfer unit receives the DNS query response from the DNS server, and stores a valid period of the correspondence.

10. The communication system according to claim 1, wherein
the control unit:
holds a list of a process name as the list of the item that can be specified from the IP address; and
specifies, when header information of the new packet is notified from the packet transfer unit, a process name corresponding to an IP address included in the header information.

11. The communication system according to claim 1, wherein
the control unit:
holds a list of a user name of a process as the list of the item that can be specified from the IP address, and
specifies, when header information of the new packet is notified from the packet transfer unit, a user name corresponding to an IP address included in the header information.

12. A communication control method applied to a communication system comprising a packet transfer unit, implemented by a processor, to transfer a packet; and a control unit, implemented by the processor, to hold a list of an item that can be specified from an IP address, and set, in the packet transfer unit, control information defining an operation of the packet transfer unit according to header information of a packet, the method comprising:
when having received a new packet that is a packet for which control information conforming to header information has not been set yet, notifying, by the packet transfer unit, the control unit of header information of the new packet, and
setting, by the control unit, control information in the packet transfer unit based on an item specified from an IP address included in the header information and based on the list, when the header information is notified from the packet transfer unit, wherein when having set control information in the packet transfer unit, the control unit transmits an item specified from an IP address when setting the control information, and a content of the control information, to a management server to be operated by an administrator, wherein the control unit:
- sets control information indicating inhibition of communication by the new packet in the packet transfer unit when the list does not include the item specified from the IP address included in header information, and sets control information indicating permission of communication by the new packet in the packet transfer unit when the list includes the item specified from the IP address included in the header information; and
- stores, when having set control information since the list includes the item specified from the IP address included in the header information, a correspondence between the item in the list and the control information, the management server transmits, when an instruction to delete an item designated by the administrator from the list is inputted from the administrator, the instruction to the control unit, and the control unit deletes the item designated by the administrator from the list in accordance with the instruction, specifies all control information associated with the item, and commands the packet transfer unit to delete all specified control information.

\* \* \* \* \*